United States Patent
Tsuda

(10) Patent No.: US 11,290,239 B2
(45) Date of Patent: *Mar. 29, 2022

(54) COMMUNICATION CONTROL APPARATUS AND COMMUNICATION CONTROL METHOD

(71) Applicant: SONY CORPORATION, Tokyo (JP)

(72) Inventor: Shinichiro Tsuda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/239,683

(22) Filed: Jan. 4, 2019

(65) Prior Publication Data

US 2019/0140805 A1 May 9, 2019

Related U.S. Application Data

(63) Continuation of application No. 14/560,309, filed on Dec. 4, 2014, now Pat. No. 10,547,434.

(30) Foreign Application Priority Data

Dec. 11, 2013 (JP) .................... 2013-256107

(51) Int. Cl.
*H04L 5/00* (2006.01)
*H04L 1/00* (2006.01)
*H04W 72/12* (2009.01)

(52) U.S. Cl.
CPC .......... *H04L 5/0058* (2013.01); *H04L 1/0002* (2013.01); *H04L 1/0022* (2013.01); *H04L 1/0026* (2013.01); *H04W 72/12* (2013.01)

(58) Field of Classification Search
CPC ....................................... H04L 5/00
See application file for complete search history.

(56) References Cited

U.S. PATENT DOCUMENTS

| | | | |
|---|---|---|---|
| 2004/0139441 A1 | 7/2004 | Kaburaki et al. | |
| 2004/0264489 A1 | 12/2004 | Klemets et al. | |
| 2007/0260691 A1* | 11/2007 | Kallqvist | ............... H04L 51/38 709/206 |
| 2009/0201885 A1* | 8/2009 | Kuroda | ............... H04W 52/286 370/335 |

(Continued)

FOREIGN PATENT DOCUMENTS

JP 2013-150181 A 8/2013

OTHER PUBLICATIONS

Non-Final Rejection for U.S. Appl. No. 14/560,309, dated Feb. 26, 2019, 13 pages.

(Continued)

*Primary Examiner* — Sulaiman Nooristany
(74) *Attorney, Agent, or Firm* — Chip Law Group

(57) ABSTRACT

There is provided a communication control apparatus including an acquisition section that acquires first information related to communication quality of a wireless channel through which target data to be distributed to a terminal apparatus is transmitted to the terminal apparatus, and second information related to data among the target data, the data being accumulated in the terminal apparatus, and a control section that performs control over transmission of the target data to the terminal apparatus on the basis of the first information and the second information.

16 Claims, 26 Drawing Sheets

| TIME INDEX | 0 | 1 | 2 | 3 | 4 | 5 | 6 |
|---|---|---|---|---|---|---|---|
| CQI INDEX | 7 | 7 | 7 | 13 | 15 | 2 | 3 |
| INCREMENT (BIT) | 1.4766 × 10 | 1.4766 × 10 | 1.4766 × 10 | – | – | 0.2344 × 10 | 0.3770 × 10 |
| DECREMENT (BIT) | – | – | – | 20 | 20 | – | – |
| ACCUMULATED DATA AMOUNT (BIT) | 14.766 | 29.532 | 44.298 | 24.298 | 4.298 | 6.642 | 10.412 |

(56) References Cited

U.S. PATENT DOCUMENTS

| | | | |
|---|---|---|---|
| 2010/0098011 A1* | 4/2010 | Pelletier | H04W 72/1242 370/329 |
| 2010/0322187 A1 | 12/2010 | Tani et al. | |
| 2011/0276714 A1 | 11/2011 | Yoshida | |
| 2013/0163431 A1 | 6/2013 | Backholm et al. | |
| 2014/0086159 A1* | 3/2014 | Sajadieh | H04W 72/12 370/329 |
| 2014/0254359 A1 | 9/2014 | Alisawi | |
| 2015/0055660 A1 | 2/2015 | Takase | |
| 2015/0236967 A1 | 8/2015 | Rozenberg | |

OTHER PUBLICATIONS

Advisory Action for U.S. Appl. No. 14/560,309, dated Jan. 4, 2019, 02 pages.

Final Rejection for U.S. Appl. No. 14/560,309, dated Oct. 26, 2018,15 pages.

Non-Final Rejection for U.S. Appl. No. 14/560,309, dated May 22, 2018, 10 pages.

Advisory Action for U.S. Appl. No. 14/560,309, dated Dec. 27, 2017, 04 pages.

Final Rejection for U.S. Appl. No. 14/560,309, dated Oct. 18, 2017, 10 pages.

Non-Final Rejection for U.S. Appl. No. 14/560,309, dated Jun. 27, 2017, 10 pages.

Final Rejection for U.S. Appl. No. 14/560,309, dated Mar. 14, 2017, 09 pages.

Non-Final Rejection for U.S. Appl. No. 14/560,309, dated Nov. 28, 2016, 11 pages.

Notice of Allowance for U.S. Appl. No. 14/560,309 dated Sep. 20, 2019.

Final Office Action for U.S. Appl. No. 14/560,309 dated Jun. 10, 2019.

Non Final Office Action for U.S. Appl. No. 14/560,309 dated Feb. 26, 2019.

* cited by examiner

FIG.1

| CQI INDEX | MODULATION SCHEME | TRANSMISSION EFFICIENCY (NUMBER OF BITS PER SYMBOL) |
|---|---|---|
| 0 | – | – |
| 1 | QPSK | 0.1523 |
| 2 | QPSK | 0.2344 |
| 3 | QPSK | 0.3770 |
| 7 | 16QAM | 1.4766 |
| 8 | 16QAM | 1.9141 |
| 9 | 16QAM | 2.4063 |
| 12 | 64QAM | 3.9023 |
| 13 | 64QAM | 4.5234 |
| 14 | 64QAM | 5.1152 |
| 15 | 64QAM | 5.5547 |

FIG.2

| TIME INDEX | 0 | 1 | 2 | 3 | 4 | 5 | 6 |
|---|---|---|---|---|---|---|---|
| CQI INDEX | 7 | 7 | 7 | 13 | 15 | 2 | 3 |
| INCREMENT (BIT) | $1.4766 \times 10$ | $1.4766 \times 10$ | $1.4766 \times 10$ | — | — | $0.2344 \times 10$ | $0.3770 \times 10$ |
| DECREMENT (BIT) | — | — | — | 20 | 20 | — | — |
| ACCUMULATED DATA AMOUNT (BIT) | 14.766 | 29.532 | 44.298 | 24.298 | 4.298 | 6.642 | 10.412 |

FIG.3

| TIME INDEX | 0 | 1 | 2 | 3 | 4 | 5 | 6 |
|---|---|---|---|---|---|---|---|
| CQI INDEX | 7 | 7 | 7 | 13 | 15 | 2 | 3 |
| INCREMENT (BIT) | 10 | 10 | 10 | 10 | - | - | 10 |
| DECREMENT (BIT) | - | - | - | - | 20 | 20 | - |
| ACCUMULATED DATA AMOUNT (BIT) | 10 | 20 | 30 | 40 | 20 | 0 | 10 |

FIG.7

| TIME INDEX | 0 | 1 | 2 | 3 | 4 | 5 | 6 |
|---|---|---|---|---|---|---|---|
| CQI INDEX | 7 | 7 | 7 | 13 | 15 | 2 | 3 |
| INCREMENT (BIT) | $1.4766 \times 10$ | $1.4766 \times 10$ | $1.4766 \times 10$ | $5.5547 \times 10$ | - | - | - |
| DECREMENT (BIT) | - | - | - | 20 | - | 20 | 20 |
| ACCUMULATED DATA AMOUNT (BIT) | 14.766 | 29.532 | 44.298 | 24.298 | 59.845 | 39.845 | 19.845 |

FIG. 10

| AMOUNT OF ACCUMULATED DATA (BIT) | CQI INDEX | |
|---|---|---|
| | 0 TO 7 | 8 TO 15 |
| X ≤ 10 | 4 | 5 |
| 10 < X < 40 | 2 | 3 |
| 40 ≤ X | 1 | 1 |

FIG.15

| PRIORITY | CONGESTION THRESHOLD |
|---|---|
| 1 | 0.2 |
| 2 | 0.4 |
| 3 | 0.6 |
| 4 | 0.8 |
| 5 | 0.9 |

# COMMUNICATION CONTROL APPARATUS AND COMMUNICATION CONTROL METHOD

CROSS REFERENCE TO RELATED APPLICATIONS

The present application is a continuation application of U.S. patent application Ser. No. 14/560,309 filed Dec. 4, 2014, which claims the priority from prior Japanese Priority Patent Application JP 2013-256107 filed in the Japan Patent Office on Dec. 11, 2013. Each of the above-referenced applications is hereby incorporated herein by reference in its entirety.

BACKGROUND

The present disclosure relates to a communication control apparatus, a communication control method, and a program.

3G mobile phone services called the third generation started in Japan in 2002. At first, small-sized packets were transmitted and received for transmission of voice calls and e-mail. The introduction of high speed downlink packet access (HSDPA), however, allowed larger-sized packets to be transmitted and received for downloading of music files and streaming of video. Services of long term evolution (LTE) also started with such an increase in the packet capacity, the services of LTE having orthogonal frequency division multiple access (OFDMA) used for downlinks to expand wireless networks. In addition, 4G services are going to start in around 2015. This may allow for up to 1 Gbps (bit per second) semi-fixedly and also up to 100 Mbps even in a moving environment.

The increasing communication speed expects more and more data distribution like downloading and streaming. Accordingly, a variety of techniques have been devised for data distribution such as downloading and streaming.

For example, JP 2013-150181A discloses the technology for receiving data distributed in a streaming manner, causing an external storage apparatus to temporarily store the received data, and reading out the stored data from the external storage apparatus in reproducing the data.

SUMMARY

However, when data to be distributed to terminal apparatuses is continuously transmitted via wireless channels of wireless networks, the wireless networks have to bear a heavy load. To the contrary, limiting the transmission of data via the wireless channels too much may debase the quality of services for the distribution.

It is then desirable to provide a mechanism that makes it possible to reduce loads on wireless networks while preventing the quality of data distribution services from degrading.

According to an embodiment of the present disclosure, there is provided a communication control apparatus including an acquisition section configured to acquire first information related to communication quality of a wireless channel through which target data to be distributed to a terminal apparatus is transmitted to the terminal apparatus, and second information related to data among the target data, the data being accumulated in the terminal apparatus, and a control section configured to perform control over transmission of the target data to the terminal apparatus on the basis of the first information and the second information.

According to another embodiment of the present disclosure, there is provided a communication control method including acquiring first information related to communication quality of a wireless channel through which target data to be distributed to a terminal apparatus is transmitted to the terminal apparatus, and second information related to data among the target data, the data being accumulated in the terminal apparatus, and performing control, by a processor, over transmission of the target data to the terminal apparatus on the basis of the first information and the second information.

According to still another embodiment of the present disclosure, there is provided a program for causing a computer to execute acquiring first information related to communication quality of a wireless channel through which target data to be distributed to a terminal apparatus is transmitted to the terminal apparatus, and second information related to data among the target data, the data being accumulated in the terminal apparatus, and performing control over transmission of the target data to the terminal apparatus on the basis of the first information and the second information.

According to one or more of embodiments of the present disclosure as described above, it becomes possible to reduce loads on wireless networks while preventing the quality of data distribution services from degrading. The above-described advantageous effects are not necessarily limited, but any of the advantageous effects shown herein or another advantageous effect that can be grasped herein may be attained in combination with the above-described advantageous effects or instead of the above-described advantageous effects.

BRIEF DESCRIPTION OF THE DRAWINGS

FIG. 1 is an explanatory diagram for describing an example of a relationship between communication quality and an amount of data to be transmitted;

FIG. 2 is an explanatory diagram for describing a first example of a technique of transmitting target data to be distributed to a terminal apparatus;

FIG. 3 is an explanatory diagram for describing a second example of a technique of transmitting target data to be distributed to a terminal apparatus;

FIG. 7 is an explanatory diagram for describing a specific example of a first example of data transmission control according to the first embodiment;

FIG. 10 is an explanatory diagram for describing an example of priority of transmission of target data to a terminal apparatus through a wireless channel;

FIG. 15 is an explanatory diagram for describing an example of a threshold of a congestion level corresponding to priority;

DETAILED DESCRIPTION OF THE EMBODIMENT(S)

Figure 4:
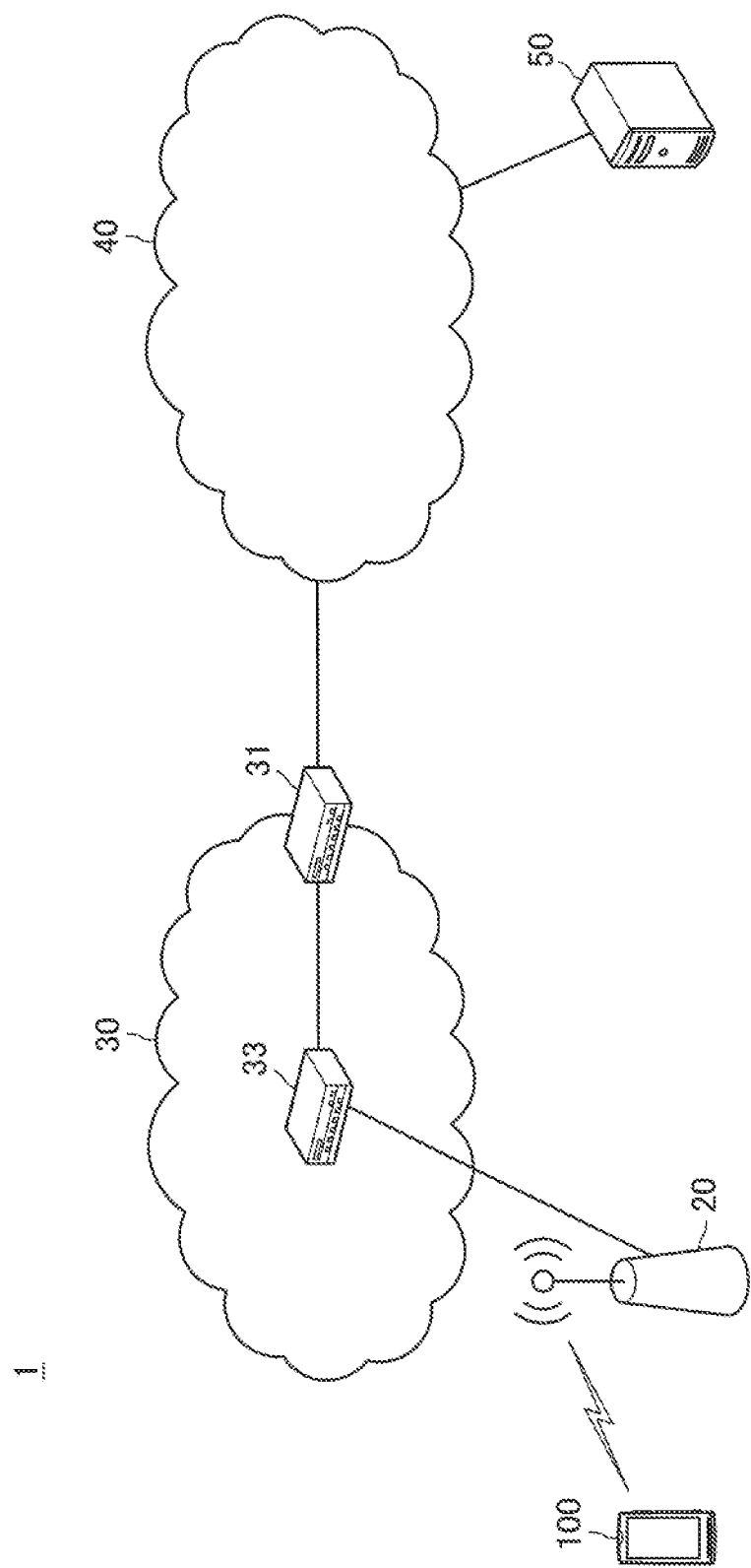
FIG. 4 is an explanatory diagram illustrating an example of a schematic configuration of a communication system 1 according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Introduction
2. First Embodiment
2.1. Schematic Configuration of Communication System
2.2. Configuration of Terminal Apparatus
2.3. Processing Procedure
2.4. Examples of Data Transmission Control
2.4.1. First Example of Data Transmission Control
2.4.2. Second Example of Data Transmission Control
2.4.3. Third Example of Data Transmission Control
2.5. Modified Examples
2.5.1. First Modified Example
2.5.2. Second Modified Example
2.5.3. Third Modified Example
2.5.4. Fourth Modified Example
2.5.5. Fifth Modified Example
3. Second Embodiment
3.1. Schematic Configuration of Communication System
3.2. Configuration of Control Entity
3.3. Processing Procedure
3.4. Example of Data Transmission Control
3.5. Modified Examples
4. Application Examples
4.1. Application Examples for Control Entity
4.2. Application Examples for Terminal Apparatus
5. Conclusion

1. INTRODUCTION

First of all, the description will be made for a relationship between communication quality and the amount of data to be transmitted, and an example of transmission of target data to be distributed to a terminal apparatus.

(Relationship Between Communication Quality and Amount of Data to Be Transmitted)

Even if the same amounts of radio resources are used, high communication quality allows more data to be transmitted than low communication quality does. A specific example will be described for this point below with reference to FIG. 1

FIG. 1 is an explanatory diagram for describing an example of a relationship between communication quality and the amount of data to be transmitted. FIG. 1 illustrates channel quality indicator (CQI) indexes of long term evolution (LTE), and modulation schemes and transmission efficiency (number of bits per symbol) corresponding thereto. Larger CQI indexes represent better communication quality. When a CQI index is, for example, 15, 5.5547 bits of data can be transmitted in one symbol. Meanwhile, when a CQI index is 1, only 0.1523 bits of data can be transmitted in one symbol. That is, it is possible with a CQI index of 1 to transmit only about one thirty-sixth of data transmitted with a CQI of 15.

(Examples of Technique of Transmitting Target Data to Be Distributed to Terminal Apparatus)

Several techniques are used for transmitting target data to be distributed to terminal apparatuses through wireless channels of a wireless network. Two examples of the technique of transmitting target data will be described below.

FIRST EXAMPLE

When the amount of unprocessed data accumulated in the buffer of the terminal apparatus among the target data to be distributed to a terminal apparatus is larger than or equal to a first threshold, the transmission of the target data is temporarily stopped in a first example of the technique.

Serial processing (e.g. processing for reproduction) is then performed on the unprocessed data accumulated in the buffer. Once the amount of unprocessed data is smaller than or equal to a second threshold, the transmission of the target data is started again. Since a sufficient amount of the unprocessed data accumulated in the buffer of the terminal apparatus hereby prevents the data from being transmitted to the terminal apparatus through a wireless channel, the wireless network bears a lighter load. A specific example of this technique will be described below with reference to FIG. 2.

FIG. 2 is an explanatory diagram for describing a first example of the technique of transmitting target data to be distributed to a terminal apparatus. FIG. 2 illustrates a CQI index, an increment that represents the amount of unprocessed data increasing in a buffer, a decrement that represents the amount of unprocessed data decreasing in a buffer, and an accumulated data amount that represents the amount of unprocessed data accumulated in a buffer at the time of each time index. The increment is obtained by subtracting the amount of unprocessed data to be serially processed by a terminal apparatus from the amount of data to be transmitted to the terminal apparatus. When no data is transmitted to a terminal apparatus, the decrement represents the amount of unprocessed data to be serially processed by the terminal apparatus. That is, the amount of unprocessed data accumulated in a buffer decreases by the amount of unprocessed data to be serially processed because new unprocessed data is not introduced to the buffer when no data is transmitted to a terminal apparatus. To the contrary, when data is transmitted to a terminal apparatus, the decrement is 0 as long as the increment exists. When the amount of unprocessed data already accumulated in the buffer is sufficient for serial processing, a terminal apparatus serially processes the unprocessed data. Conversely, when the amount of unprocessed data already accumulated in the buffer is insufficient for serial processing, a terminal apparatus serially processes the unprocessed data already accumulated in the buffer and at least a part of data newly transmitted to the terminal apparatus. Let us assume here that the amount of unprocessed data to be serially processed by the terminal apparatus is 20 bits at the time of each index. It is also assumed that the amount of data to be transmitted to a terminal apparatus is obtained by adding the amount of data for 10 symbols to the amount of data to be serially processed (i.e. 20 bits). That is, when data is transmitted to a terminal apparatus, the increment represents the amount of data for 10 symbols, and the accumulated data increases by the amount of data for 10 symbols. Conversely, when no data is transmitted to a terminal apparatus, the decrement is 20 bits, and the accumulated data decreases by 20 bits. First of all, since a CQI index is 7 at the time of each of the time indexes 0 to 2, unprocessed data for 10 symbols which is transmitted at a transmission efficiency of 1.4776 bits/symbol (i.e. 14.766 bits of data) is added in a buffer. As a result, the accumulated data amount is larger than or equal to a first threshold (40 bits) at the time of time index 2. The transmission of data to the terminal apparatus is thus stopped at the time of time index 3. Meanwhile, serial processing on the unprocessed data continues even after the time of time index 3, so that the accumulated data decreases by 20 bits at the time of each of the time indexes 3 and 4. Consequently, the remaining accumulated data amount is smaller than or equal to a second threshold (10 bits) at the time of time index 4. Accordingly, the transmission of data to the terminal apparatus is started again at the time of time index 5. Since a CQI index is 2 at the time of time index 5, unprocessed data for 10 symbols which is transmitted at a transmission efficiency of 0.2344 bits/symbol (i.e. 2.344 bits of data) is added in the buffer. Meanwhile, since a CQI index is 3 at the time of time index 6, unprocessed data for 10 symbols which is transmitted at a transmission efficiency of 0.3770 bits/symbol (i.e. 3.770 bits of data) is added in the buffer.

As described above, target data to be distributed to terminal apparatuses is, for example, transmitted through wireless channels of a wireless network. No data is transmitted to a terminal apparatus at the time of CQIs of 13 and 15 (i.e. time of time indexes 3 and 4) in this example, while data is transmitted to a terminal apparatus at the time of CQIs of 2 and 3 (i.e. time of time indexes 5 and 6). Accordingly, the transmission efficiency is low, and a smaller amount of data is transmitted in the same amount of radio resources. In other words, more radio resources are used to transmit the same amount of data. The wireless network thus has to bear a heavy load. Specifically, the transmission efficiency (number of bits per symbol) in the example of FIG. 2 represents 1.00824(=(1.4766+1.4766+1.4766+0.2344+0.3770)/5).

SECOND EXAMPLE

Like the first example of the technique, the transmission of target data to be distributed to terminal apparatuses is also stopped and started in a second example of the technique. Different from the first example of the technique, the second example of the technique does not, however, use any CQI index, but has the constant amount of data transmitted to terminal apparatuses. A specific example of this technique will be described below with reference to FIG. 3.

FIG. 3 is an explanatory diagram for describing the second example of the technique of transmitting target data to be distributed to a terminal apparatus. FIG. 3 illustrates a CQI index, an increment, a decrement, and an accumulated data amount at the time of each time index. Let us assume here that the amount of unprocessed data to be serially processed by the terminal apparatus is 20 bits at the time of each index. It is also assumed that the amount of data to be transmitted to a terminal apparatus is obtained by adding 10 bits to the amount of data to be serially processed (i.e. 20 bits) (namely adds up to 30 bits). That is, when data is transmitted to a terminal apparatus, the increment is 10 bits, and the accumulated data increases by 10 bits. Conversely, when no data is transmitted to a terminal apparatus, the decrement is 20 bits, and the accumulated data decreases by 20 bits. First of all, data is transmitted to a terminal apparatus at the time of each of the time indexes 0 to 3, and 10 bits of data are added in the buffer. As a result, the accumulated data amount is larger than or equal to a first threshold (40 bits) at the time of time index 3. Accordingly, the transmission of data to the terminal apparatus is stopped at the time of time index 4. Meanwhile, serial processing on the unprocessed data continues even after the time of time index 4, so that the accumulated data decreases by 20 bits at the time of each of the time indexes 4 and 5. Consequently, the remaining accumulated data amount is smaller than or equal to a second threshold (10 bits) at the time of time index 5. Accordingly, the transmission of data to the terminal apparatus is started again at the time of time index 6. Data is transmitted to the terminal apparatus at the time of time index 6, and 10 bits of data are added in the buffer.

As described above, target data to be distributed to terminal apparatuses is, for example, transmitted through wireless channels of a wireless network. 30 bits of data are transmitted at the time of time index 6 in particular in this example, although a CQI is 3. Accordingly, the transmission efficiency is low, and more radio resources are used to transmit the same amount of data (e.g. 30 bits of data). The wireless network thus has to bear a heavy load. Specifically, the transmission efficiency (number of bits/symbol) in the example of FIG. 2 represents 1.01931(=(30×5)/(30/1.4766+ 30/1.4766+30/1.4766+30/4.5234+30/0.3770)).

It should be understood that the examples described with reference to FIGS. 2 and 3 are merely simplified behavior models.

2. FIRST EMBODIMENT

Next, a first embodiment of the present disclosure will be described with reference to FIGS. 4 to 18.

According to the first embodiment of the present disclosure, a terminal apparatus controls the transmission of target data to be distributed to the terminal apparatus. More specifically, the terminal apparatus controls the transmission of the target data to the terminal apparatus on the basis of first information related to the communication quality of a wireless channel through which the target data is transmitted to the terminal apparatus, and second information related to data among the target data, the data being accumulated in the terminal apparatus.

This makes it possible to reduce loads on wireless networks while, for example, preventing the quality of data distribution services from degrading.

2.1. SCHEMATIC CONFIGURATION OF COMMUNICATION SYSTEM

First of all, a schematic configuration of a communication system 1 according to the first embodiment of the present disclosure will be described with reference to FIG. 4. FIG. 4 is an explanatory diagram illustrating an example of the schematic configuration of the communication system 1 according to the first embodiment of the present disclosure. FIG. 4 shows that the communication system 1 includes a terminal apparatus 100, a base station 20, a first gateway 31, a second gateway 33, and data distribution apparatus 50.

The terminal apparatus 100 wirelessly communicates with the base station 20 when the terminal apparatus 100 is positioned within the communication area (i.e. cell) of the base station 20. For example, the base station 20 transmits information (control information and data) to the terminal apparatus 100 through a wireless channel, and the terminal apparatus 100 receives the information. To the contrary, the terminal apparatus 100 transmits information (control information and data) to the base station 20 through a wireless channel, and the base station 20 receives the information. For example, each of the wireless channels is one or more frequency bands. As an example, each of the wireless channels is one or more component carriers (CC).

In addition, the terminal apparatus 100 communicates with the data distribution apparatus 50 via the base station 20, a core network 30, and a public network 40. The data distribution apparatus 50 distributes data. For example, the data distribution apparatus 50 distributes data to the terminal apparatus 100 via the public network 40, the core network 30, and the base station 20. Specifically, target data to be distributed to a terminal apparatus is, for example, transmitted from the data distribution apparatus 50 to the first gateway 31 via the public network 40. The first gateway 31 is a node that connects the core network 30 to the public network 40, and is referred to as packet data network gateway (P-GW), for example, in LTE. The target data is then transmitted further from the first gateway 31 to the second gateway 33. The second gateway 33 is a node that relays data, and is referred to as serving gateway (S-GW), for example, in LTE. Furthermore, the target data is transmitted from the second gateway 33 to the base station 20. The target data is thereafter transmitted to the terminal apparatus 100 by the base station 20 through a wireless channel.

The target data is, for example, content data. As an example, the target data is moving image data. The data distribution apparatus 50 distributes the target data to the terminal apparatus 100 in a streaming manner, for example. The terminal apparatus 100 controls the transmission of target data to the terminal apparatus 100 in the first embodiment in particular, the target data being to be distributed to the terminal apparatus 100.

2.2. CONFIGURATION OF TERMINAL APPARATUS 100

Figure 5:
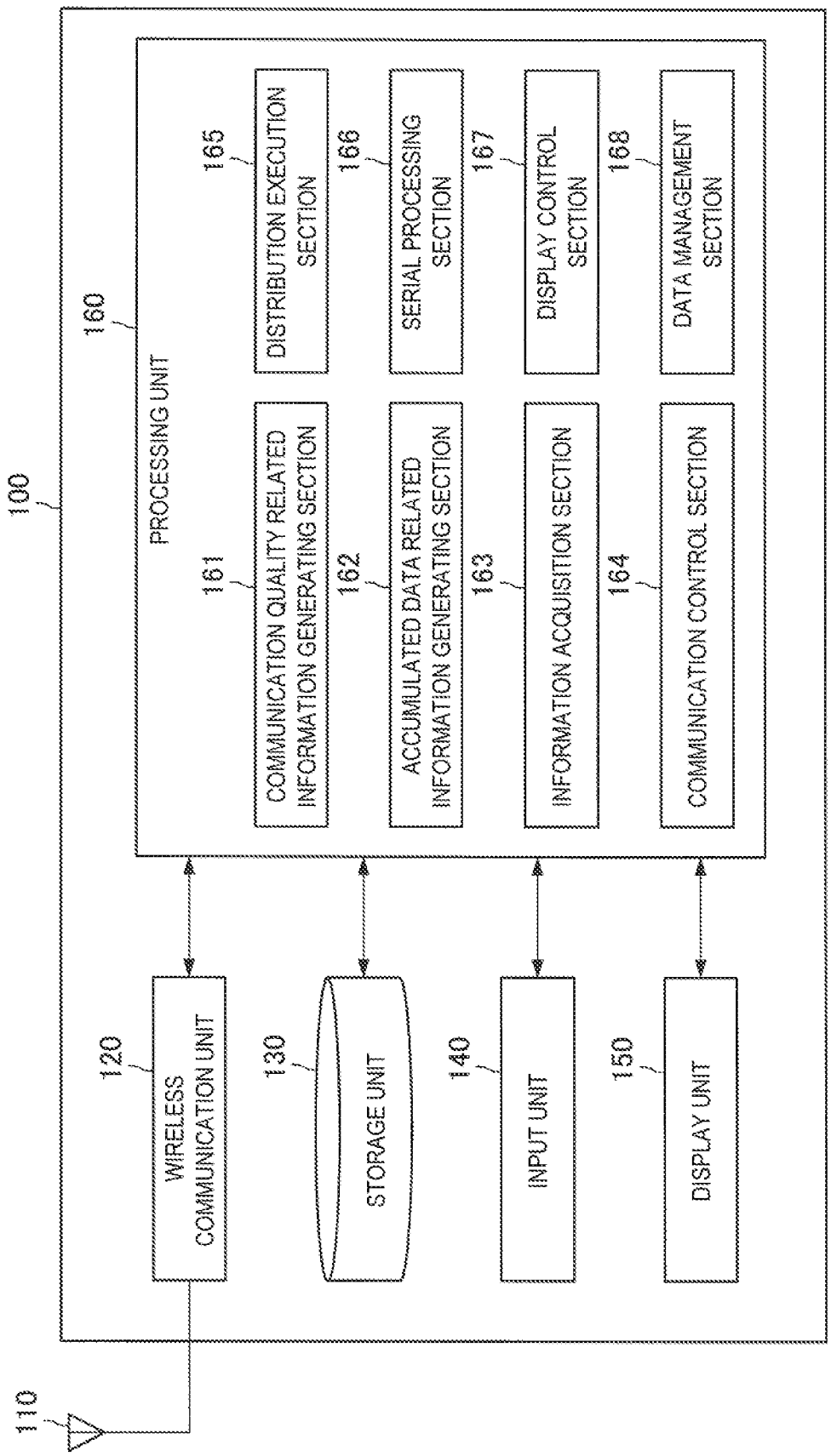
FIG. 5 is a block diagram illustrating an example of a configuration of a terminal apparatus according to the first embodiment.

First of all, an example of the configuration of the terminal apparatus 100 according to the first embodiment will be described with reference to FIG. 5. FIG. 5 is a block diagram illustrating the example of the configuration of the terminal apparatus 100 according to the first embodiment. FIG. 5 shows that the terminal apparatus 100 includes an antenna unit 110, a wireless communication unit 120, a storage unit 130, an input unit 140, a display unit 150, and a processing unit 160.

(Antenna Unit 110)

The antenna unit 110 emits a signal into the space as a radio wave, the signal being output by the wireless communication unit 120. The antenna unit 110 also converts a radio wave in the space into a signal, and outputs the signal to the wireless communication unit 120.

(Wireless Communication Unit 120)

The wireless communication unit 120 performs wireless communication. For example, the wireless communication unit 120 receives a downlink signal from the base station 20 and transmits an uplink signal to the base station 20 when the terminal apparatus 100 is positioned within the communication area (i.e. cell) of the base station 20.

(Storage Unit 130)

The storage unit 130 temporarily or persistently stores a program and data for the operation of the terminal apparatus 100.

(Input Unit 140)

The input unit 140 accepts an input from a user to the terminal apparatus 100. The input unit 140 then provides a result of the input to the processing unit 160.

(Display Unit 150)

The display unit 150 displays a screen (i.e. output image) of the terminal apparatus 100. The display unit 150 displays a screen, for example, in accordance with the control of the processing unit 160 (display control section 167).

(Processing Unit 160)

The processing unit 160 provides a variety of functions of the terminal apparatus 100. The processing unit 160 includes a communication quality related information generating section 161, an accumulated data related information generating section 162, an information acquisition section 163, a communication control section 164, a distribution execution section 165, a serial processing section 166, a display control section 167, and a data management section 168.

(Communication Quality Related Information Generating Section 161)

The communication quality related information generating section 161 generates first information (which will be referred to as "communication quality related information" below) related to the communication quality of a wireless channel through which target data to be distributed to the terminal apparatus 100 is transmitted to the terminal apparatus 100.

Target Data

The target data is distributed, for example, by the data distribution apparatus 50. That is, the target data is transmitted from the data distribution apparatus 50 to the terminal apparatus 100 via the first gateway 31, the second gateway 33, and the base station 20.

The target data is, for example, content data. As an example, the target data is moving image data. The data distribution apparatus 50 distributes the target data to the terminal apparatus 100 in a streaming manner, for example.

Communication Quality Information

The communication quality related information includes, for example, communication quality information indicating the communication quality of the wireless channel. More specifically, the communication quality information is information indicating at least one of the channel quality indicator (CQI) of the wireless channel, the reception strength and the reception quality of a reference signal transmitted through the wireless channel, and the signal-to-interference-plus-noise ratio (SINR) of the wireless channel, for example. For example, the reception strength of a reference signal is reference signal received power (RSRP), while the reception quality of a reference signal is reference signal received quality (RSRQ).

The communication quality related information generating section 161, for example, measures the communication quality of the wireless channel, and generates the communication quality information from a result of the measurement. Specifically, the communication quality related information generating section 161, for example, measures at least one of the CQI, the RSRP, the RSRQ, and the SINR upon receiving a reference signal transmitted by the base station 20 through the wireless channel. The communication quality related information generating section 161 then generates communication quality information indicating at least one of the CQI, the RSRP, the RSRQ, and the SINR.

This communication quality information, for example, makes it possible to know how efficiently target data to be distributed to the terminal apparatus 100 is transmitted through a wireless channel.

(Accumulated Data Related Information Generating Section 162)

The accumulated data related information generating section 162 generates second information (which will be referred to as "accumulated data related information" below) related to data (which will be referred to "accumulated data" below) among the target data, the data being accumulated in the terminal apparatus 100.

Accumulated Data

The accumulated data, for example, means data among the target data, the data having already been transmitted to the terminal apparatus 100, but having not yet been serially processed by the terminal apparatus 100.

For example, data to be transmitted to the terminal apparatus 100 among the target data is stored in the buffer of the terminal apparatus 100. The buffer is, for example, a storage area, which is a part of the storage unit 130. The terminal apparatus 100 (serial processing unit 166) then serially processes the target data stored in the buffer. In this case, the accumulated data means the data that has been stored in the buffer, but has not yet been serially processed by the terminal apparatus 100.

As an example, the target data is moving image data to be distributed to the terminal apparatus 100 in a streaming manner as discussed above. The terminal apparatus 100 reproduces the target data. In this case, the accumulated data means the data that has been stored in the buffer, but has not yet been reproduced by the terminal apparatus 100.

Data Amount Information

For example, the accumulated data related information includes data amount information indicating the amount of the accumulated data. The accumulated data related information generating section 162, for example, refers to the buffer of the storage unit 130 and calculates the amount of the accumulated data to generate the data amount information.

This communication quality information, for example, makes it possible to know how urgently data is transmitted.

(Information Acquisition Section 163)

The information acquisition section 163 acquires the communication quality related information and the accumulated data related information.

When the communication quality related information is generated by the communication quality related information generating section 161, the information acquisition section 163, for example, acquires the communication quality related information. Meanwhile, when the accumulated data related information is generated by the accumulated data related information generating section 162, the information acquisition section 163 acquires the accumulated data related information.

(Communication Control Section 164)

The communication control section 164 performs control over the transmission of the target data to the terminal apparatus 100 (which will be referred to as "data transmission control" below) on the basis of the communication quality related information and the accumulated data related information. Additionally, an example of the data transmission control will be described below in detail.

(Distribution Execution Section 165)

The distribution execution section 165 performs processing of the terminal apparatus 100 for the distribution of the target data to the terminal apparatus 100.

The distribution execution section 165, for example, makes a request to the data distribution apparatus 50. Specifically, the distribution execution section 165, for example, requests the data distribution apparatus 50 to distribute the target data. For example, the distribution execution section 165 also requests the data distribution apparatus 50 to stop distributing the target data. For example, the distribution execution section 165 also requests the data distribution apparatus 50 to resume distributing the target data.

The distribution execution section 165, for example, causes the storage unit 130 to store data among the target data, the data having been transmitted to the terminal apparatus 100. More specifically, the distribution execution section 165, for example, stores the data that has been transmitted to the terminal apparatus 100 in the buffer of the storage unit 130.

Additionally, the distribution execution section 165 may operate in accordance with any protocol such as hyper text transfer protocol (HTTP) and file transfer protocol (FTP).

(Serial Processing Section 166)

The serial processing section 166 serially processes the target data. The serial processing section 166, for example, serially processes the accumulated data stored in the buffer.

As an example, the target data is moving image data to be distributed to the terminal apparatus 100 in a streaming manner as discussed above, and the serial processing section 166 reproduces the target data. More specifically, the serial processing section 166, for example, reproduces the accumulated data stored in the buffer. In this case, for example, the serial processing section 166 decodes the accumulated data, generates a frame image of the moving image, and provides the generated frame image to the display control section 167. As a result, a screen including the frame image is displayed on the display unit 150.

(Display Control Section 167)

The display control section 167 controls display of the screen appearing on the display unit 150. The display control section 167, for example, generates a screen to be displayed by the display unit 150, and causes the display unit 150 to display the screen.

(Data Management Section 168)

The data management section 168 manages data among the target data, the data having been transmitted to the terminal apparatus 100.

Deletion of Data

When the data transmitted to the terminal apparatus 100 among the target data is serially processed by the terminal apparatus 100, the data management section 168, for example, deletes the processed data.

The data management section 168, for example, deletes the serially processed data among the data stored in the buffer from the buffer. That is, the data management section 168 deletes data among the data stored in the buffer other than the accumulated data (i.e. data that has not yet been serially processed by the terminal apparatus 100). As an example, the target data is moving image data to be distributed to the terminal apparatus 100 in a streaming manner as discussed above, and the data management section 168 deletes the reproduced data.

This deletion of unnecessary data, for example, allows the storage area (e.g. buffer of the storage unit 130) to store more. Accordingly, this may lead to an increase in the storable amount of the accumulated data (i.e. data that has not yet been serially processed by the terminal apparatus 100).

Calculation of Data Amount

The data management section 168, for example, calculates the amount of data among the target data the data having been transmitted to the terminal apparatus 100 and serially processed by the terminal apparatus 100.

All of the target data is, for example, transmitted to the terminal apparatus 100 and serially processed by the terminal apparatus 100. In this case, the amount calculated by the data management section 168 is the same as the amount of the target data. Meanwhile, a part of the target data is transmitted to the terminal apparatus 100 and serially processed by the terminal apparatus 100. The amount calculated by the data management section 168 is the same as the amount of the part of the target data. In other words, the amount calculated by the data management section 168 (i.e. amount of data to be serially processed by the terminal apparatus 100) is the same as the amount of data to be transmitted to the terminal apparatus 100 in these cases. Meanwhile, although a part or all of the target data is, for example, transmitted to the terminal apparatus 100, a part of the transmitted data alone is serially processed, and then the serial processing is finished. The amount calculated by the data management section 168 (i.e. amount of data to be serially processed by the terminal apparatus 100) is smaller than the amount of data to be transmitted to the terminal apparatus 100 in this case. That is, the amount of data used by the terminal apparatus 100 is calculated.

The calculated amount is used for charging for the distribution of the target data, for example. In this case, the terminal apparatus 100 (e.g. data management section 168), for example, provides information indicating the calculated amount to an apparatus that manages the charging (which will be referred to as "charge management apparatus" below).

As an example, the target data is moving image data to be distributed to the terminal apparatus 100 in a streaming manner as discussed above, and the data management section 168 calculates the amount of the reproduced data. The data management section 168 then provides information indicating the calculated amount to the charge management apparatus.

This allows charges to be made, on the basis of, for example, not the amount of data transmitted to the terminal apparatus 100, but the amount of data serially processed by the terminal apparatus 100 (e.g. data reproduced by the terminal apparatus). That is, charges can be made more user-friendly for distribution services for the target data.

2.3. PROCESSING PROCEDURE

Figure 6:
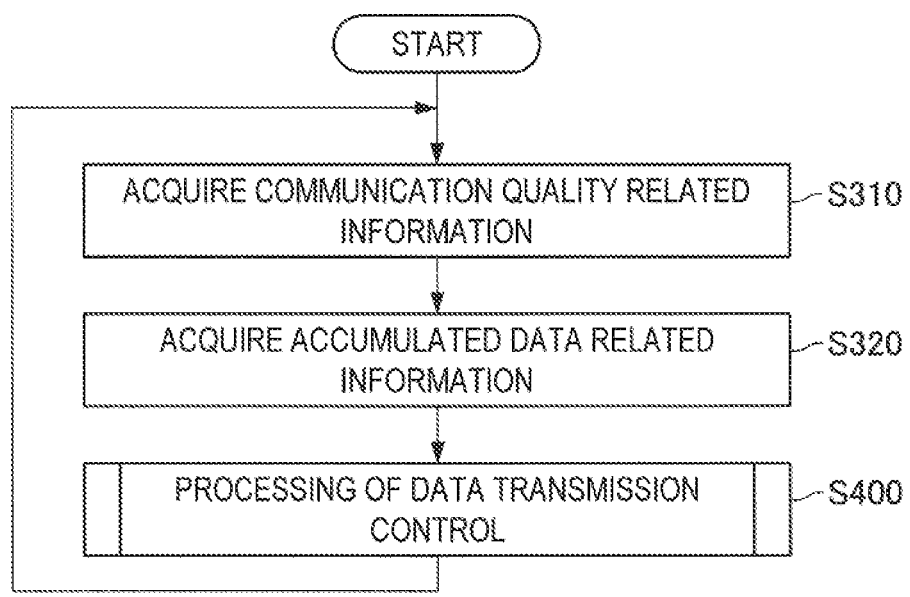
FIG. 6 is a flowchart illustrating an example of a schematic procedure of communication control processing according to the first embodiment.

Next, an example of communication control processing according to the first embodiment will be described with reference to FIG. 6. FIG. 6 is a flowchart illustrating an example of a schematic procedure of the communication control processing according to the first embodiment.

The information acquisition section 163 acquires communication quality related information (S310). The communication quality related information is related to the communication quality of a wireless channel through which target data to be distributed to the terminal apparatus 100 is transmitted to the terminal apparatus 100. The information acquisition section 163 also acquires accumulated data related information (S320). The accumulated data related information is related to data (i.e. accumulated data) among the target data, the data being accumulated in the terminal apparatus 100. The communication control section 164 then executes processing of data transmission control (S400). That is, the communication control section 164 performs control over the transmission of the target data to the terminal apparatus 100 (i.e. data transmission control) on the basis of the communication quality related information and the accumulated data related information.

2.4. EXAMPLES OF DATA TRANSMISSION CONTROL

Next, examples of the data transmission control will be described with reference to FIGS. 7 to 14.

2.4.1. First Example of Data Transmission Control

First of all, a first example of the data transmission control will be described with reference to FIGS. 7 and 8.

(Terminal Apparatus 100: Communication Control Section 164)

As the first example, the data transmission control includes deciding to start or stop the transmission of target data to the terminal apparatus 100, the target data being to be distributed to the terminal apparatus 100. That is, the communication control section 164 decides to start or stop the transmission of the target data to the terminal apparatus 100.

First, while the target data is transmitted to the terminal apparatus 100, the communication control section 164, for example, determines whether the amount of data (i.e. accumulated data) accumulated in the terminal apparatus 100 among the target data is larger than or equal to a first threshold on the basis of the data amount information. If the amount of accumulated data is larger than or equal to the first threshold, the communication control section 164 decides to stop the transmission of the target data to the terminal apparatus 100.

Second, when the transmission of the target data to the terminal apparatus 100 is stopped, the communication control section 164, for example, determines whether the amount of accumulated data is smaller than or equal to a second threshold on the basis of the data amount information. If the amount of accumulated data is smaller than or equal to the second threshold, the communication control section 164 decides to start (i.e. resume) the transmission of the target data to the terminal apparatus 100.

Third, when the transmission of the target data to the terminal apparatus 100 is stopped, the communication control section 164, for example, determines whether the communication quality of a wireless channel through which the target data is transmitted to the terminal apparatus 100 is satisfactory on the basis of the communication quality information. If the communication quality is satisfactory, the communication control section 164 decides to start (i.e. resume) the transmission of the target data to the terminal apparatus 100. As an example, the communication control section 164 determines whether the CQI index of the wireless channel is greater than or equal to a predetermined threshold. If the CQI index is greater than or equal to the predetermined threshold, the communication control section 164 decides to start (i.e. resume) the transmission of the target data to the terminal apparatus 100.

For example, the communication control section 164 decides to start or stop the transmission of target data to the terminal apparatus 100 as discussed above. For example, the distribution execution section 165 then requests the data distribution apparatus 50 to resume or stop the distribution of the target data once the decision to start or stop the transmission is made. As a result, the transmission of the target data to the terminal apparatus 100 is started or stopped. A specific example of the first example of the data transmission control will be described with reference to FIG. 7.

FIG. 7 is an explanatory diagram for describing the specific example of the first example of the data transmission control according to the first embodiment. FIG. 7 illustrates a CQI index, an increment that represents the amount of unprocessed data increasing in a buffer, a decrement that represents the amount of unprocessed data decreasing in a buffer, and an accumulated data amount that represents the amount of unprocessed data accumulated in a buffer at the time of each time index. The increment is obtained by subtracting the amount of unprocessed data to be serially processed by the terminal apparatus 100 from the amount of data to be transmitted to the terminal apparatus 100. When no data is transmitted to the terminal apparatus 100, the decrement represents the amount of unprocessed data to be serially processed by the terminal apparatus 100. That is, the amount of unprocessed data accumulated in a buffer decreases by the amount of unprocessed data to be serially processed because new unprocessed data is not introduced to the buffer when no data is transmitted to the terminal apparatus 100. To the contrary, when data is transmitted to the terminal apparatus 100, the decrement is 0 as long as the increment exists. When the amount of unprocessed data already accumulated in the buffer is enough for serial processing, the terminal apparatus 100 serially processes the unprocessed data. Conversely, when the amount of unprocessed data already accumulated in the buffer is insufficient for serial processing, the terminal apparatus 100 serially processes the unprocessed data already accumulated in the buffer and at least a part of data newly transmitted to the terminal apparatus 100. Let us assume here that the amount of unprocessed data to be serially processed by the terminal apparatus 100 is 20 bits at the time of each index. It is also assumed that the amount of data to be transmitted to the terminal apparatus 100 is obtained by adding the amount of data for 10 symbols to the amount of data to be serially processed (i.e. 20 bits). That is, when data is transmitted to the terminal apparatus 100, the increment represents the amount of data for 10 symbols, and the accumulated data increases by the amount of data for 10 symbols. Conversely, when no data is transmitted to the terminal apparatus 100, the decrement is 20 bits, and the accumulated data decreases by 20 bits. First of all, since a CQI index is 7 at the time of each of time indexes 0 to 2, unprocessed data for 10 symbols which is transmitted at a transmission efficiency of 1.4776 bits/symbol (i.e. data of 14.766 bits) is added in a buffer. As a result, the accumulated data amount is larger than or equal to a first threshold (40 bits) at the time of time index 2. The transmission of data to the terminal apparatus 100 is thus stopped at the time of time index 3. Meanwhile, serial processing on the unprocessed data continues even after the time of time index 3, so that the accumulated data decreases by 20 bits at the time of the time index 3. A CQI index is 13, and is greater than or equal to a predetermined threshold (e.g. 8) at the time of time index 3. Accordingly, the transmission of data to the terminal apparatus 100 is started again at the time of time index 4. Since a CQI index is 15 at the time of time index 4, unprocessed data for 10 symbols which is transmitted at a transmission efficiency of 5.5547 bits/symbol (i.e. 55.547 bits of data) is added in the buffer. As a result, the accumulated data amount is larger than or equal to the first threshold (40 bits) at the time of time index 4. The transmission of data to the terminal apparatus 100 is stopped at the time of time index 5. Meanwhile, serial processing on the unprocessed data continues even after the time of time index 5, so that the accumulated data decreases by 20 bits at the time of each of time indexes 5 and 6.

For example, the transmission of target data to the terminal apparatus 100 is started or stopped as discussed above. When the communication quality is satisfactory (e.g. at the time of time index 4, at which a CQI is 15, in the example of FIG. 7), data is transmitted to a terminal apparatus in this example. Accordingly, the transmission efficiency is high, and a larger amount of data is transmitted in the same amount of radio resources. In other words, less radio resources are used to transmit the same amount of data. As a result, the wireless network bears a lighter load. Specifically, the transmission efficiency in the example of FIG. 7 (number of bits per symbol) represents 2.49613(=(1.4766+1.4766+1.4766+5.5547)/4), which is higher than the transmission efficiency (1.00824 bits/symbol) in the example of FIG. 2 and the transmission efficiency (1.01931 bits/symbol) in FIG. 3. Since data can be more efficiently transmitted, it is possible to prevent the quality of data distribution services from degrading. For example, an enough amount of accumulated data (e.g. the amount of accumulated data is larger than or equal to the first threshold) stops the transmission of the target data, resulting in a lighter load on the wireless network.

This makes it possible to reduce loads on wireless networks while, for example, preventing the quality of data distribution services from degrading.

(Processing Procedure: Processing of Data Transmission Control)

Figure 8:
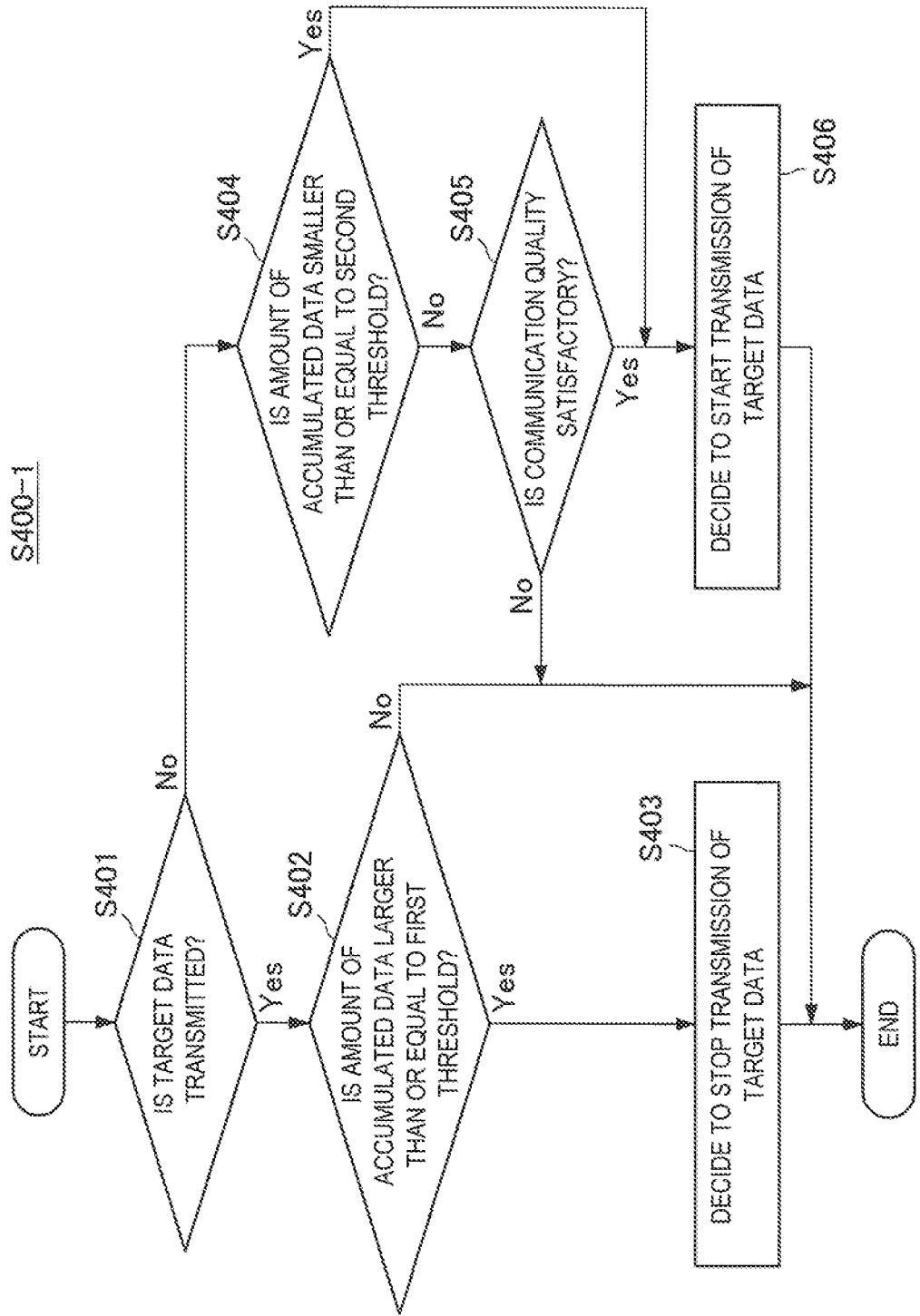
FIG. 8 is a flowchart illustrating an example of a schematic procedure of the first example of the data transmission control according to the first embodiment.

FIG. 8 is a flowchart illustrating an example of a schematic procedure of the first example of the data transmission control according to the first embodiment. If target data is transmitted (S401: YES), the communication control section 164 determines whether the amount of accumulated data is larger than or equal to a first threshold (S402).

If the amount of accumulated data is larger than or equal to the first threshold (S402: YES), the communication control section 164 decides to stop the transmission of the target data (S403). The processing is then finished. Additionally, when the decision to stop the transmission is made, the distribution execution section 165 requests the data distribution apparatus 50 to stop the distribution of the target data, so that the transmission of the target data to the terminal apparatus 100 is stopped.

If the amount of accumulated data is smaller than the first threshold (S402: NO), the processing is finished.

Meanwhile, if no target data is transmitted (S401: NO), the communication control section 164 determines whether the amount of accumulated data is smaller than or equal to a second threshold (S404).

If the amount of accumulated data is smaller than the second threshold (S404: YES), the communication control section 164 decides to start the transmission of the target data (S406). The processing is then finished. Additionally, when the decision to start the transmission is made, the distribution execution section 165 requests the data distribution apparatus 50 to resume the distribution of the target data, so that the transmission of the target data to the terminal apparatus 100 is started again. If the amount of accumulated data is larger than the second threshold (S404: NO), the communication control section 164 determines whether the communication quality is satisfactory (e.g. whether the CQI index is greater than or equal to a threshold) (S405). If the communication quality is satisfactory (S405: YES), the communication control section 164 decides to start the transmission of the target data (S406). The processing is then finished. To the contrary, if the communication quality is not satisfactory (S405: NO), the processing is finished.

2.4.2. Second Example of Data Transmission Control

Next, a second example of the data transmission control will be described with reference to FIG. 9.

(Terminal Apparatus 100: Communication Control Section 164)

As the second example, the data transmission control includes setting the frequency (which will be referred to as "data transmission frequency") of the transmission of target data to the terminal apparatus 100, the target data being to be distributed to the terminal apparatus 100. That is, the communication control section 164 sets the data transmission frequency (frequency of the transmission of the target data to the terminal apparatus 100).

First, when the data transmission frequency is, for example, set high (i.e. the target data is transmitted to the terminal apparatus 100 at high frequency), the communication control section 164 determines whether the amount of data (i.e. accumulated data) accumulated in the terminal apparatus 100 among the target data is larger than or equal to a first threshold on the basis of the data amount information. If the amount of accumulated data is larger than or equal to the first threshold, the communication control section 164 sets the data transmission frequency low.

Second, when the data transmission frequency is, for example, set low (i.e. the target data is transmitted to the terminal apparatus 100 at low frequency), the communication control section 164 determines whether the amount of accumulated data is smaller than or equal to a second threshold on the basis of the data amount information. If the amount of the accumulated data is smaller than or equal to the second threshold, the communication control section 164 sets the data transmission frequency high.

Third, when the data transmission frequency is, for example, set low, the communication control section 164 determines whether the communication quality of a wireless channel through which the target data is transmitted to the terminal apparatus 100 is satisfactory on the basis of the communication quality information. If the communication quality is satisfactory, the communication control section 164 sets the data transmission frequency high. As an example, the communication control section 164 determines whether the CQI index of the wireless channel is greater than or equal to a predetermined threshold. If the CQI index is greater than or equal to the predetermined threshold, the communication control section 164 sets the data transmission frequency high.

For example, the communication control section 164 sets the data transmission frequency high or low as discussed above. For example, the distribution execution section 165 then requests the data distribution apparatus 50 to distribute target data at high or low frequency in accordance with the setting. As a result, the target data is transmitted to the terminal apparatus 100 at high or low frequency.

For example, the target data is transmitted to the terminal apparatus 100 at high or low frequency as discussed above. When the communication quality is satisfactory, data is transmitted to a terminal apparatus at high frequency in this example. Accordingly, the transmission efficiency is high, and a larger amount of data is transmitted in the same amount of radio resources. In other words, less radio resources are used to transmit the same amount of data. As a result, the wireless network bears a lighter load. Since data can be more efficiently transmitted, it is possible to prevent the quality of data distribution services from degrading. For example, an enough amount of accumulated data (e.g. the amount of accumulated data is larger than or equal to the first threshold) causes data to be transmitted to a terminal apparatus at lower frequency, resulting in a lighter load on the wireless network.

This makes it possible to reduce loads on wireless networks while, for example, preventing the quality of data distribution services from degrading.

(Processing Procedure: Processing of Data Transmission Control)

Figure 9:
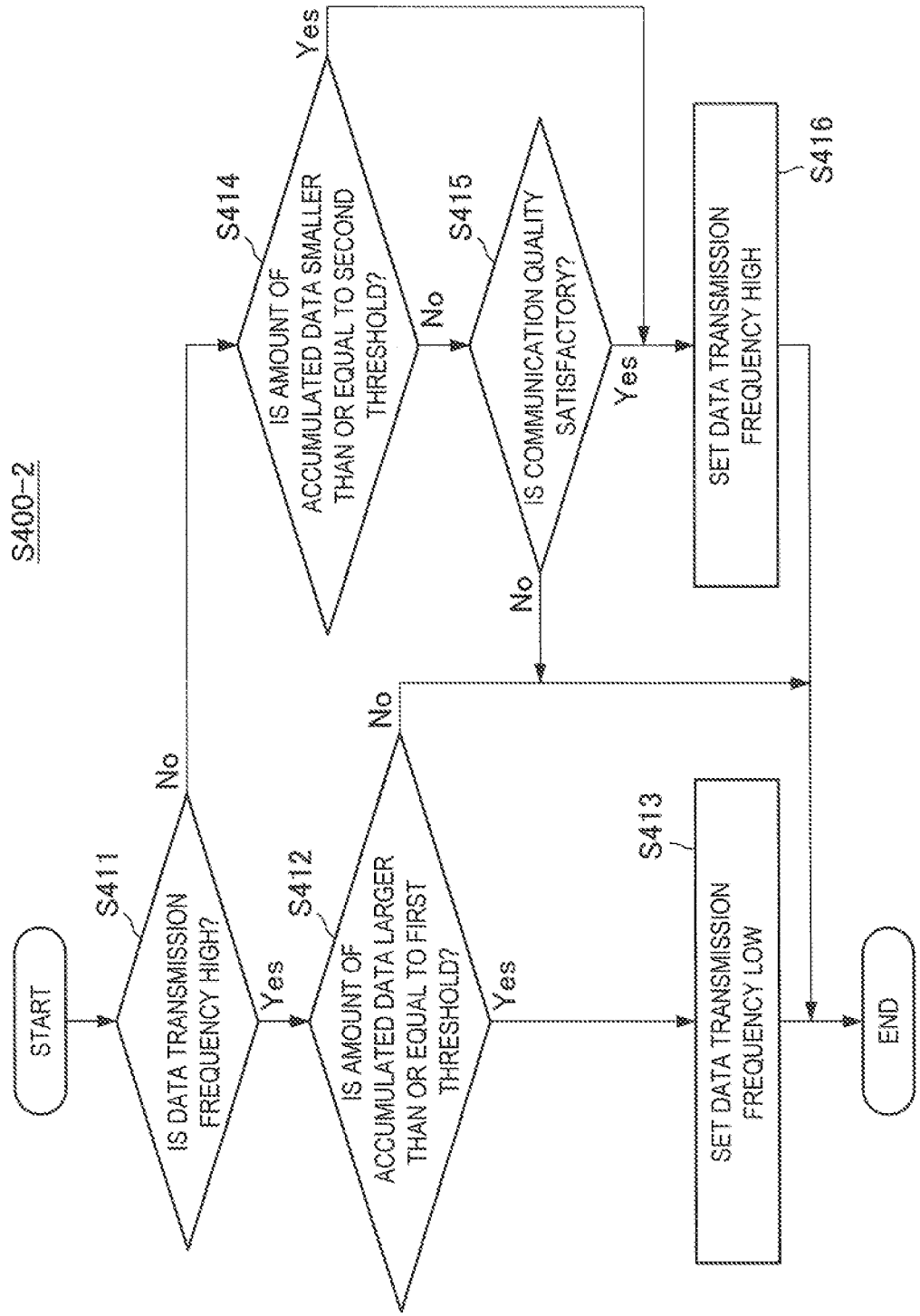
FIG. 9 is a flowchart illustrating an example of a schematic procedure of a second example of the data transmission control according to the first embodiment.

FIG. 9 is a flowchart illustrating an example of a schematic procedure of the second example of the data transmission control according to the first embodiment. If the data transmission frequency is high (S411: YES), the communication control section 164 determines whether the amount of accumulated data is larger than or equal to a first threshold (S412).

If the amount of accumulated data is larger than or equal to the first threshold (S412: YES), the communication control section 164 sets the data transmission frequency low (S413). The processing is then finished. Additionally, the distribution execution section 165 requests the data distribution apparatus 50 to distribute the target data at low frequency in accordance with the setting for the data transmission frequency, so that the target data is transmitted to the terminal apparatus 100 at low frequency. If the amount of accumulated data is smaller than the first threshold (S412: NO), the processing is finished.

Meanwhile, if the data transmission frequency is low (S411: NO), the communication control section 164 determines whether the amount of accumulated data is smaller than or equal to a second threshold (S414).

If the amount of accumulated data is smaller than or equal to the second threshold (S414: YES), the communication control section 164 sets the data transmission frequency high (S416). The processing is then finished. Additionally, the distribution execution section 165 requests the data distribution apparatus 50 to distribute the target data at high frequency in accordance with the setting for the data transmission frequency, so that the target data is transmitted to the terminal apparatus 100 at high frequency.

If the amount of accumulated data is larger than the second threshold (S414: NO), the communication control section 164 determines whether the communication quality is satisfactory (e.g. whether the CQI index is greater than or equal to a threshold) (S415). If the communication quality is satisfactory (S415: YES), the communication control section 164 sets the data transmission frequency high (S416). The processing is then finished. To the contrary, if the communication quality is not satisfactory (S415: NO), the processing is finished.

The second example of the data transmission control has been described so far. It has been described as a specific example that the data transmission frequency is set either "high" or "low," but the second example of the data transmission control is not limited to these examples. The data transmission frequency may be, for example, set to any one of three or more frequencies.

2.4.3. Third Example of Data Transmission Control

Next, a third example of the data transmission control will be described with reference to FIGS. 10 to 14.
(Terminal Apparatus 100: Communication Control Section 164)
Decision on Priority As the third example, the data transmission control includes deciding the priority of the transmission of target data to the terminal apparatus 100 through a wireless channel through which the target data is transmitted to the terminal apparatus 100, the target data being to be distributed to the terminal apparatus 100. That is, the communication control section 164 decides the priority of the transmission through the wireless channel.

The communication control section 164, for example, decides the priority of the transmission through the wireless channel on the basis of the communication quality information and the data amount information. That is, the communication control section 164 decides the priority on the basis of the communication quality (e.g. CQI) of the wireless channel and the amount of data (i.e. accumulated data) among the target data, the data being accumulated in the terminal apparatus 100. For example, as the communication quality is more satisfactory, higher priority is decided. For example, as the amount of accumulated data is smaller, higher priority is decided. A specific example will be described for this point below with reference to FIG. 10.

FIG. 10 is an explanatory diagram for describing an example of the priority of the transmission of target data to the terminal apparatus 100 through a wireless channel. FIG. 10 illustrates the amounts of accumulated data and the priority (1 to 5) corresponding to CQI indexes. A larger number means higher priority in this example. For example, when the amount of accumulated data is smaller than or equal to a second threshold (10 bits) and a CQI index is any one of 8 to 15, the highest priority "5" is decided. Meanwhile, when the amount of accumulated data is larger than or equal to a first threshold (40 bits), the lowest priority "1" is decided.

Decision on Priority Based on User's Request

Additionally, the priority may also be decided on the basis of a user's request. That is, the information acquisition section 163 may acquire third information (which will be referred to as "user request information" below) related to a request of a user of the terminal apparatus 100 for the transmission of the target data to the terminal apparatus 100 through the wireless channel. The communication control section 164 may then decide the priority further on the basis of the user request information. A specific example will be described for this point below with reference to FIG. 11.

Figure 11:
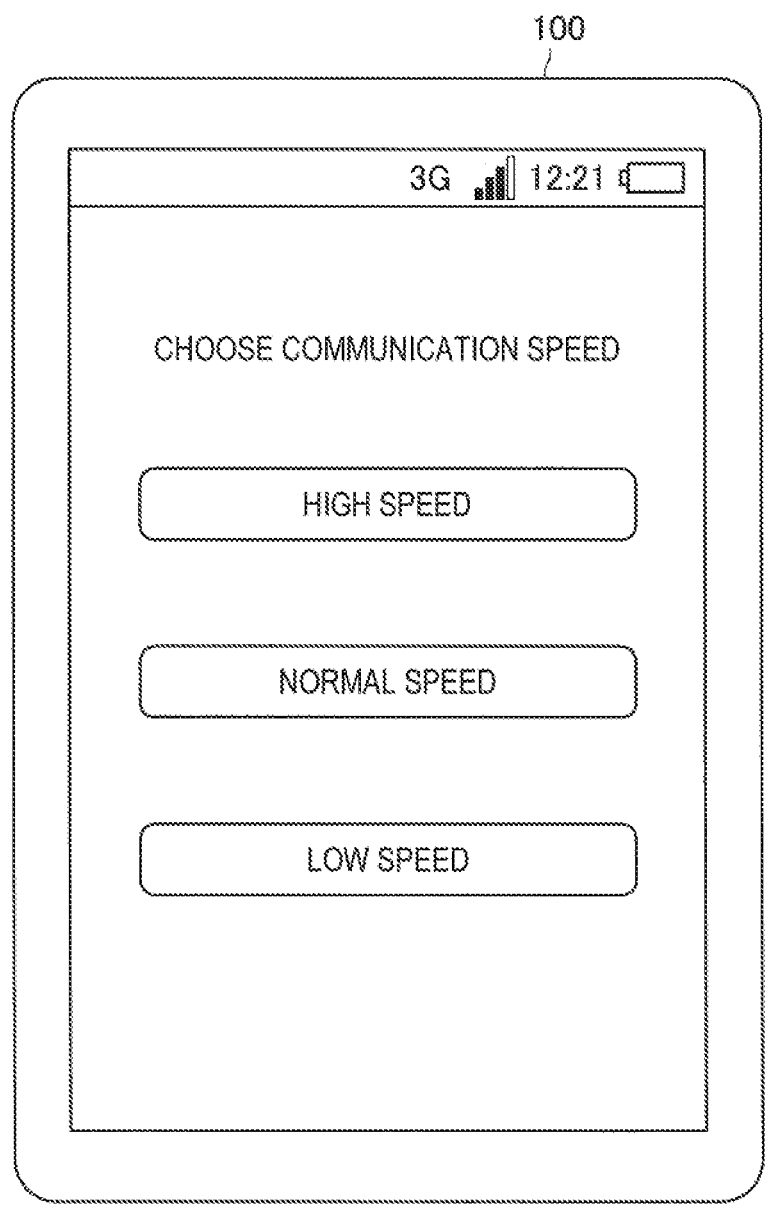
FIG. 11 is an explanatory diagram for describing an example in which priority is decided on the basis of a user's request.

FIG. 11 is an explanatory diagram for describing an example in which the priority is decided on the basis of a user's request. FIG. 11 illustrates the terminal apparatus 100. The display (display unit 150) of the terminal apparatus 100, for example, displays a screen for the selection of a request regarding communication speed. A user of the terminal apparatus 100 chooses one of "high speed," "normal speed," and "low speed." The information acquisition section 163 then acquires information according to this choice as user request information, and the communication control section 164 decides the priority further on the basis of the user request information. When a user chooses, for example, "high speed," the communication control section 164 increases the priority by one. To the contrary, when a user chooses "low speed," the communication control section 164 decreases the priority by one. Additionally, when a user chooses "normal speed," the communication control section 164 does not increase or decrease the priority.

This may, for example, attain the quality of service (QoS) according to a user's request. For example, the user convenience is improved.

Use of Priority
Use in Network

As a first example, the priority is an indicator used for a node (which will be referred to as "transmission control node" below) that controls the transmission of data to each apparatus through the wireless channel to perform the control. The terminal apparatus 100 provides information indicating the priority to the transmission control node in this case.

As an example, the transmission control node is the base station 20. The base station 20, for example, performs scheduling for the wireless channel on the basis of the priority in this case. More specifically, higher priority, for example, causes the base station 20 to more preferentially allocate radio resources for the transmission of the target data to the terminal apparatus 100.

As another example, the transmission control node may also be the first gateway 31 or the second gateway 33. In this case, the first gateway 31 or the second gateway 33 may more preferentially transfer the target data to be distributed to the terminal apparatus 100 with an increase in the priority.

Use in Terminal Apparatus 100

As a second example, the priority may be an indicator used by the terminal apparatus 100.

In this case, the data transmission control may further include starting or stopping the transmission of the target data to the terminal apparatus 100 as an example in addition to deciding the priority. The communication control section 164 may, for example, decide to start or stop the transmission of the target data to the terminal apparatus 100 on the basis of the priority.

As another example, the data transmission control may further include setting the frequency (i.e. data transmission frequency) of the transmission of the target data to the terminal apparatus 100 in addition to deciding the priority. The communication control section 164 may, for example, set the data transmission frequency on the basis of the priority.

For example, the priority is decided and used as discussed above. This allows more data to be transmitted, for example, when the communication quality is satisfactory. Accordingly, the transmission efficiency is high, and the wireless network bears a lighter load. Since data can be more efficiently transmitted, it is possible to prevent the quality of data distribution services from degrading. For example, an enough amount of accumulated data may stop the transmission of data or may allow a smaller amount of data to be transmitted, resulting in a lighter load on the wireless network.

This makes it possible to reduce loads on wireless networks while, for example, preventing the quality of data distribution services from degrading.

(Processing Procedure: Processing of Data Transmission Control)

FIRST EXAMPLE

Figure 12:
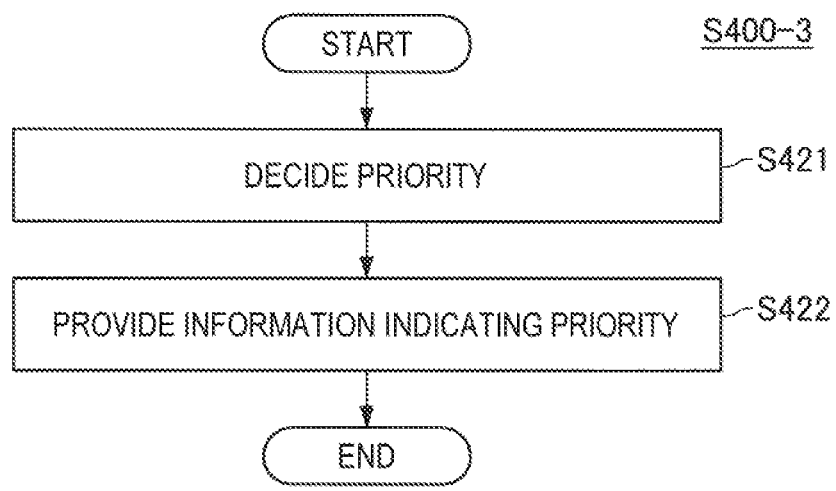
FIG. 12 is a flowchart illustrating a first example of a schematic procedure of a third example of the data transmission control according to the first embodiment.

FIG. 12 is a flowchart illustrating a first example of a schematic procedure of the third example of the data transmission control according to the first embodiment. The first example shows that the priority is an indicator used by the transmission control node.

First of all, the communication control section 164 decides the priority of the transmission of the target data to the terminal apparatus 100 through the wireless channel on the basis of the communication quality related information (e.g. communication quality information) and the accumulated data related information (e.g. data amount information) (S421). For example, the communication control section 164 decides the priority on the basis of the communication quality (e.g. CQI index) of the wireless channel and the amount of accumulated data.

The terminal apparatus 100 (e.g. communication control section 164) then provides information indicating the priority to a transmission control node (S423). The processing is then finished.

SECOND EXAMPLE

Figure 13:
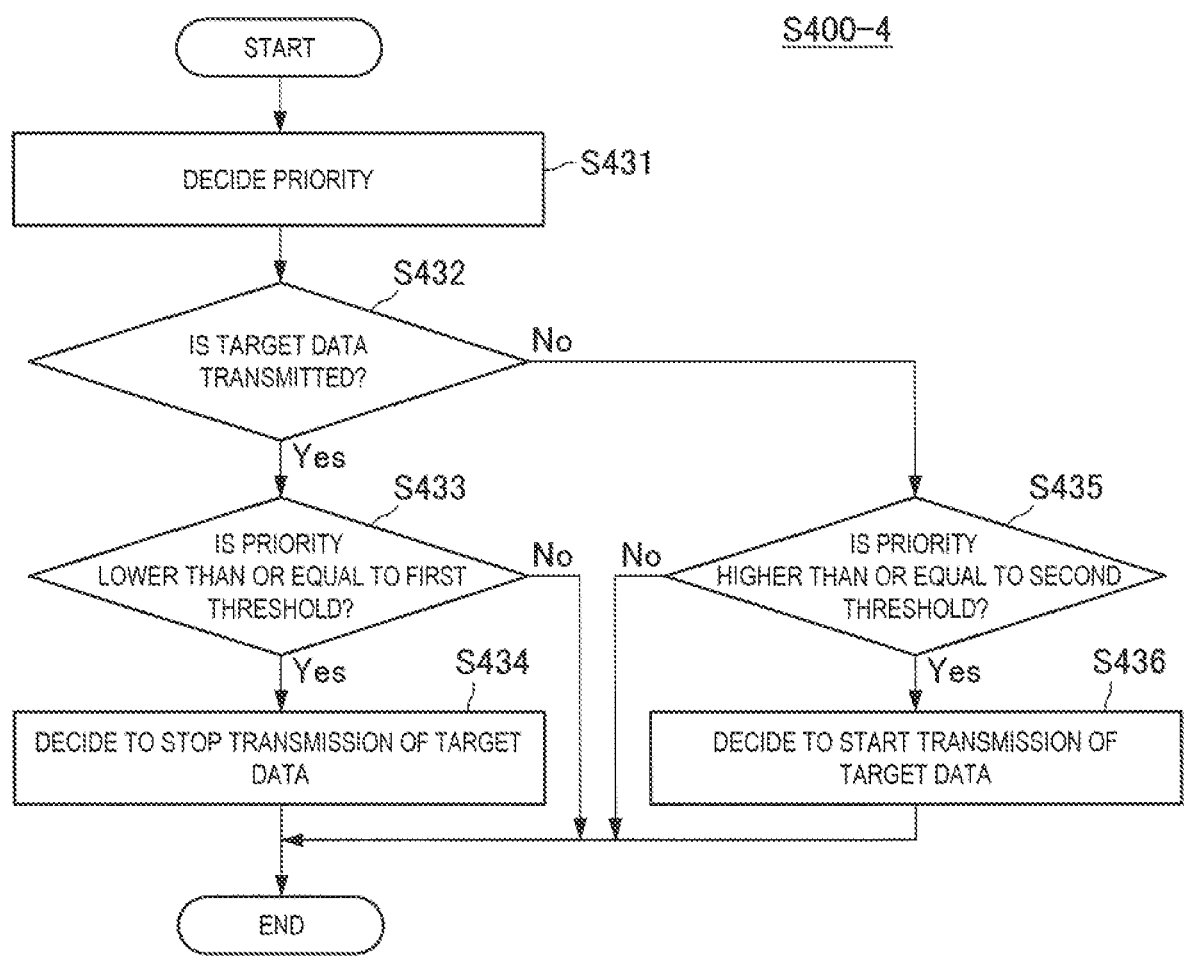
FIG. 13 is a flowchart illustrating a second example of the schematic procedure of the third example of the data transmission control according to the first embodiment.

FIG. 13 is a flowchart illustrating a second example of the schematic procedure of the third example of the data transmission control according to the first embodiment. The second example shows that the priority is an indicator used by the terminal apparatus 100.

First of all, the communication control section 164 decides the priority of the transmission of the target data to the terminal apparatus 100 through the wireless channel on the basis of the communication quality related information (e.g. communication quality information) and the accumulated data related information (e.g. data amount information) (S431). For example, the communication control section 164 decides the priority on the basis of the communication quality (e.g. CQI index) of the wireless channel and the amount of accumulated data.

When the target data is transmitted (S432: YES), the communication control section 164 then determines whether the priority is lower than or equal to a first threshold (e.g. 1) (S433). If the priority is lower than or equal to the first threshold (S433: YES), the communication control section 164 decides to stop the transmission of the target data (S434). The processing is then finished. If the priority is higher than the threshold (S433: NO), the processing is finished.

To the contrary, if the target data is not transmitted (S432: NO), the communication control section 164 determines whether the priority is higher than or equal to a second threshold (e.g. 3) (S435). If the priority is higher than or equal to the second threshold (S435: YES), the communication control section 164 decides to start the transmission of the target data (S436). The processing is then finished. If the priority is lower than the second threshold (S435: NO), the processing is finished.

THIRD EXAMPLE

Figure 14:
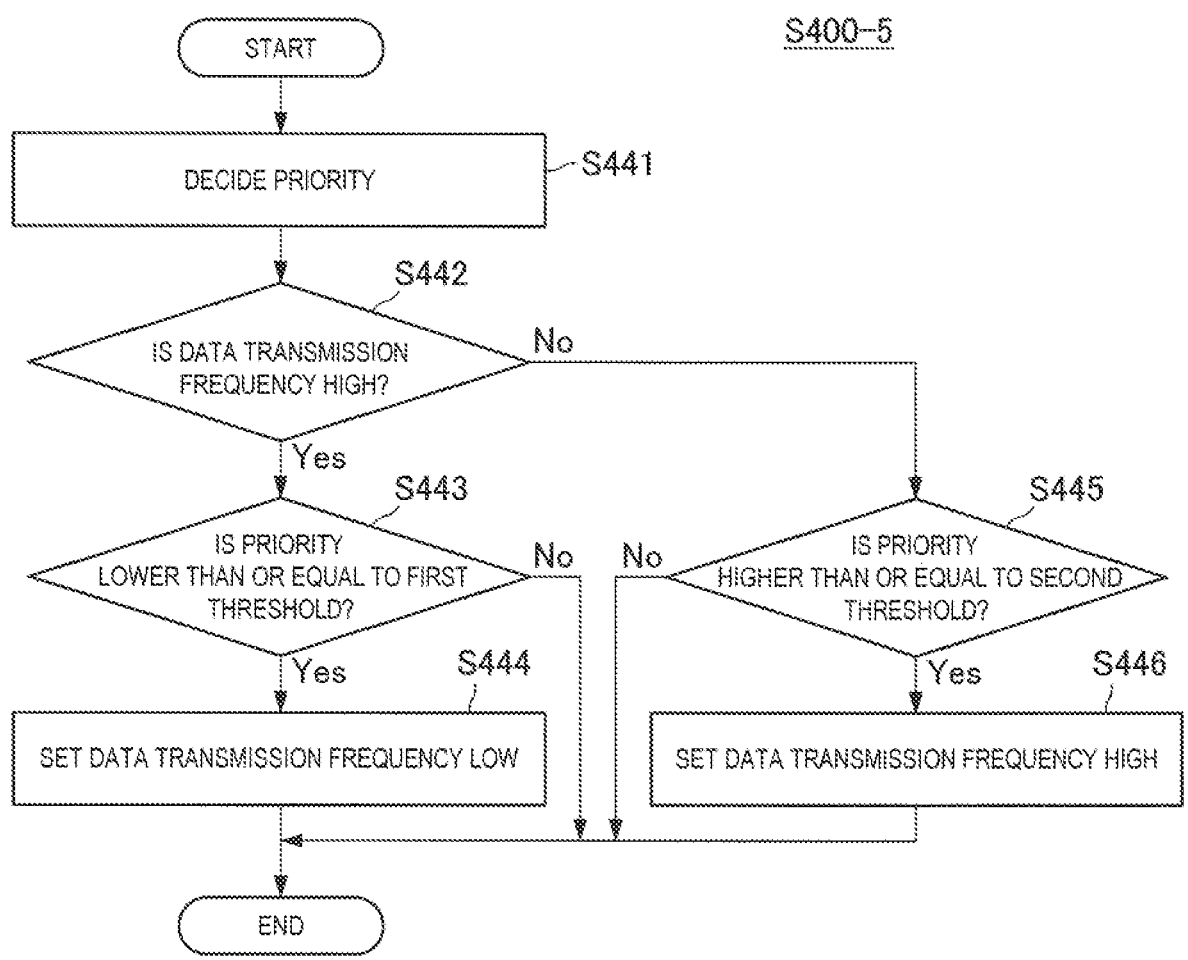
FIG. 14 is a flowchart illustrating a third example of the schematic procedure of the third example of the data transmission control according to the first embodiment.

FIG. 14 is a flowchart illustrating a third example of the schematic procedure of the third example of the data transmission control according to the first embodiment. The third example shows that the priority is an indicator used by the terminal apparatus 100.

First of all, the communication control section 164 decides the priority of the transmission of the target data to the terminal apparatus 100 through the wireless channel on the basis of the communication quality related information (e.g. communication quality information) and the accumulated data related information (e.g. data amount information) (S441). For example, the communication control section 164 decides the priority on the basis of the communication quality (e.g. CQI index) of the wireless channel and the amount of accumulated data.

When the data transmission frequency is high (S442: YES), the communication control section 164 determines whether the priority is lower than or equal to a first threshold (e.g. 1) (S443). If the priority is lower than or equal to the first threshold (S443: YES), the communication control section 164 sets the data transmission frequency low (S444). The processing is then finished. If the priority is higher than the first threshold (S443: NO), the processing is finished.

To the contrary, if the data transmission frequency is low (S442: NO), the communication control section 164 determines whether the priority is higher than or equal to a second threshold (e.g. 3) (S445). If the priority is higher than or equal to the second threshold (S445: YES), the communication control section 164 sets the data transmission frequency high (S446). The processing is then finished. If the priority is lower than the second threshold (S445: NO), the processing is finished.

2.5. MODIFIED EXAMPLES

Next, modified examples of the first embodiment will be described with reference to FIGS. 15 to 18.

2.5.1. First Modified Example

First of all, a first modified example of the first embodiment will be described. The communication quality related information (i.e. information related to the communication quality of a wireless channel through which target data to be distributed to the terminal apparatus 100 is transmitted to the terminal apparatus 100) includes communication quality information indicating the communication quality of the wireless channel in the examples of the first embodiment as discussed above.

Meanwhile, the communication quality related information includes communication speed information indicating the speed of the transmission of the target data to the terminal apparatus 100 instead of the communication quality information or in combination with the communication quality information in the first modified example of the first embodiment.

(Terminal Apparatus 100: Communication Quality Related Information Generating Section 161)
Communication Speed Information The communication quality related information includes communication speed information indicating the speed of the transmission of the target data to the terminal apparatus 100 in the first modified example.

The communication quality related information generating section 161, for example, calculates the speed of the transmission of the target data to generate the communication speed information. Specifically, the distribution execution section 165, for example, stores the data transmitted to the terminal apparatus 100 in the buffer of the storage unit 130 as discussed above. In this case, the communication quality related information generating section 161 acquires the amount of the data that has been stored in the buffer, and calculates the amount of data that is transmitted per unit time as the communication speed. A unit of communication speed is, for example, bit per second (bps) here. Additionally, when serial processing (e.g. processing for reproduction) is performed in parallel, and at least part of the data stored in the buffer is instantly processed serially, the amount of the at least part of data that is instantly processed serially may be taken into account to calculate the communication speed.

This communication speed information indicates how much data is transmitted through a wireless channel, so that the communication speed information may be used in the same way as the communication quality information. Specifically, high communication speed means that the communication quality of a wireless channel is satisfactory, while low communication speed means that the communication quality of a wireless channel is unsatisfactory.

(Terminal Apparatus 100: Communication Control Section 164)

The communication control section 164 performs the data transmission control on the basis of the communication quality related information including the communication speed information, and the accumulated data related information in the first modified example.

Specifically, the communication control section 164 performs the data transmission control, on the basis of, for example, the communication speed information and the data amount information. That is, the communication control section 164 uses the communication quality information and the data amount information in performing the data transmission control in the examples as discussed above, but uses, for example, the communication speed information instead of the communication quality information in the first modified example.

Needless to say, the communication control section 164 may use not only the communication quality information, but also the communication speed information in performing the data transmission control. The communication control section 164 may perform the data transmission control, on the basis of, for example, the communication quality information, the communication speed information, and the data amount information. For example, while the transmission of the target data to the terminal apparatus 100 is stopped, the communication speed is not calculated. The communication control section 164 may then perform the data transmission control on the basis of the communication quality information and the data amount information while the transmission is stopped. Meanwhile, the communication control section 164 may perform the data transmission control on the basis of the communication speed information and the data amount information during the transmission. Additionally, the communication control section 164 may perform the data transmission control on the basis of the communication speed information and the data amount information not only during the transmission, but also during a predetermined period (e.g. 30 seconds) after the transmission is stopped. That is, the communication control section 164 may use the communication speed information assuming that the communication speed remains valid for a while after the transmission is stopped.

As discussed above, the communication speed information is used in the first modified example. This communication speed information, for example, makes it possible to know how efficiently target data to be distributed to the terminal apparatus 100 is transmitted through a wireless channel. For example, the transmission of the target data to the terminal apparatus 100 may be appropriately controlled.

(Processing Procedure)

The data transmission control in the first modified example is the same as the examples described with reference to FIGS. 8, 9, and 12 to 14 except that communication speed (communication speed information) is, for example, used instead of communication quality (communication quality information).

2.5.2. Second Modified Example

Next, a second modified example of the first embodiment will be described with reference to FIGS. 15 to 17.

The communication quality related information (i.e. information related to the communication quality of a wireless channel through which target data to be distributed to the terminal apparatus 100 is transmitted to the terminal apparatus 100) includes communication quality information indicating the communication quality of the wireless channel in the examples of the first embodiment as discussed above. The communication quality related information further includes congestion information indicating a congestion level of the wireless channel in the second modified example of the first embodiment.

(Terminal Apparatus 100: Communication Quality Related Information Generating Section 161)
Congestion Information The communication quality related information further includes congestion information indicating a congestion level of the wireless channel in the second modified example.

The communication quality related information generating section 161 decides the congestion level, on the basis of, for example, energy per chip divided by the noise power density (Ec/No), energy per chip divided by the interference power density (Ec/Io) or RSRQ, or values proportional to or correlating to these indicators. For example, a higher congestion level is decided with lower Ec/No, Ec/Io, or RSRQ because the lower Ec/No, Ec/Io, or RSRQ indicates that the wireless channel is more congested. The communication quality related information generating section 161 may decide the corrected congestion level further on the basis of an indicator such as RSCP, RSRP, and SINR.

Additionally, the communication quality related information generating section 161 does not generate the congestion information, but another node (e.g. base station) may generate the congestion information and provide the congestion information to the terminal apparatus 1 instead.

(Terminal Apparatus 100: Communication Control Section 164)

The communication control section 164 performs the data transmission control on the basis of the communication quality related information including the congestion information, and the accumulated data related information in the first modified example.

Specifically, the communication control section 164 performs the data transmission control, on the basis of, for example, the communication quality information, the data amount information, and the congestion information.

First Example Case of Data Transmission Control

For example, as described as the first example of the data transmission control, the communication control section 164 decides to start or stop the transmission of the target data to the terminal apparatus 100. In this case, for example, a decision to start the transmission is less likely to be made with a higher congestion level, but a decision to stop the transmission is more likely to be made with a higher congestion level. To the contrary, a decision to start the transmission is more likely to be made with a lower congestion level, but a decision to stop the transmission is less likely to be made with a lower congestion level. As an example, a threshold used to decide to start and stop the transmission is dynamically decided in accordance with the congestion level.

Second Example Case of Data Transmission Control

For example, as described as the second example of the data transmission control, the communication control section 164 sets the frequency (i.e. data transmission frequency) of the transmission of the target data to the terminal apparatus 100. In this case, for example, the data transmission frequency is less likely to be set high with a higher congestion level, but the data transmission frequency is more likely to be set low with a higher congestion level. To the contrary, the data transmission frequency is more likely to be set high with a lower congestion level, but the data transmission frequency is less likely to be set low with a lower congestion level. As an example, a threshold used to set the data transmission frequency is dynamically decided in accordance with the congestion level.

Third Example Case of Data Transmission Control

For example, as described as the third example of the data transmission control, the communication control section 164 decides the priority of the transmission of the target data to the terminal apparatus 100 through the wireless channel. The terminal apparatus 100 (communication control section 164), for example, uses the priority.

In this case, the communication control section 164 decides to start or stop the transmission of the target data to the terminal apparatus 100 on the basis of, for example, the priority and the congestion level. More specifically, a threshold of the congestion level corresponding to the priority is, for example, predefined. For example, the threshold is predefined so as to increase with higher priority, and so as to decrease with lower priority. If the congestion level is higher than or equal to the threshold corresponding to the priority while the target data is being transmitted to the terminal apparatus 100, the communication control section 164 decides to stop the transmission. That is, high priority prevents the transmission from being stopped, even when the congestion level is slightly high. However, the transmission is stopped with low priority when the congestion level is slightly high. When the transmission of the target data to the terminal apparatus 100 is stopped, the communication control section 164 decides to start the transmission as long as the congestion level is lower than the threshold corresponding to the priority. That is, the transmission is started with high priority even when the congestion level is slightly high, but the transmission is not started with low priority when the congestion level is slightly high. An example of the threshold of the congestion level corresponding to the priority will be described below with reference to FIG. 15.

FIG. 15 is an explanatory diagram for describing an example of a threshold of the congestion level corresponding to the priority. FIG. 15 illustrates thresholds of the congestion levels corresponding to priority 1 to 5. For example, a threshold of the congestion level is, for example, 0.2, which is extremely low, with the priority 1 (i.e. lowest priority). To the contrary, a threshold of the congestion level is 0.9, which is extremely high, with the priority 5 (i.e. highest priority). Higher priority corresponds to a higher threshold of the congestion level in this way, while lower priority corresponds to a lower threshold of the congestion level.

Additionally, the communication control section 164 may set the data transmission frequency on the basis of the priority and the congestion level. More specifically, when the data transmission frequency is, for example, high and the congestion level is higher than or equal to the threshold corresponding to the priority, the communication control section 164 may set the data transmission frequency low. That is, data is continuously transmitted at high frequency with high priority even when the congestion level is slightly high. Data is, however, transmitted at low frequency with low priority when the congestion level is slightly high. When the data transmission frequency is low, the communication control section 164 may set the data transmission frequency high as long as the congestion level is lower than the threshold corresponding to the priority. That is, data is transmitted at high frequency with high priority even when the congestion level is slightly high. Data is continuously transmitted at low frequency with low priority when the congestion level is slightly high.

As discussed above, the congestion information is used in the second modified example. This makes the transmission of data less likely to be resumed, for example, when a wireless network is congested. Accordingly, the transmission of data is more likely to be stopped. For example, when a wireless network is not congested, the transmission of data is more likely to be resumed, so that the transmission of data is less likely to be stopped. Accordingly, it is possible to reduce loads on the wireless network.

(Processing Procedure)

First Example Case of Data Transmission Control

When the first example of the data transmission control is used, the data control processing in the second modified example is the same as the example described with reference to FIG. 8 except that a threshold is, for example, dynamically decided in accordance with the congestion level.

Second Example Case of Data Transmission Control

When the second example of the data transmission control is used, the data control processing in the second modified example is the same as the example described with reference to FIG. 9 except that a threshold is, for example, dynamically decided in accordance with the congestion level.

Third Example Case of Data Transmission Control

FIRST EXAMPLE

Figure 16:
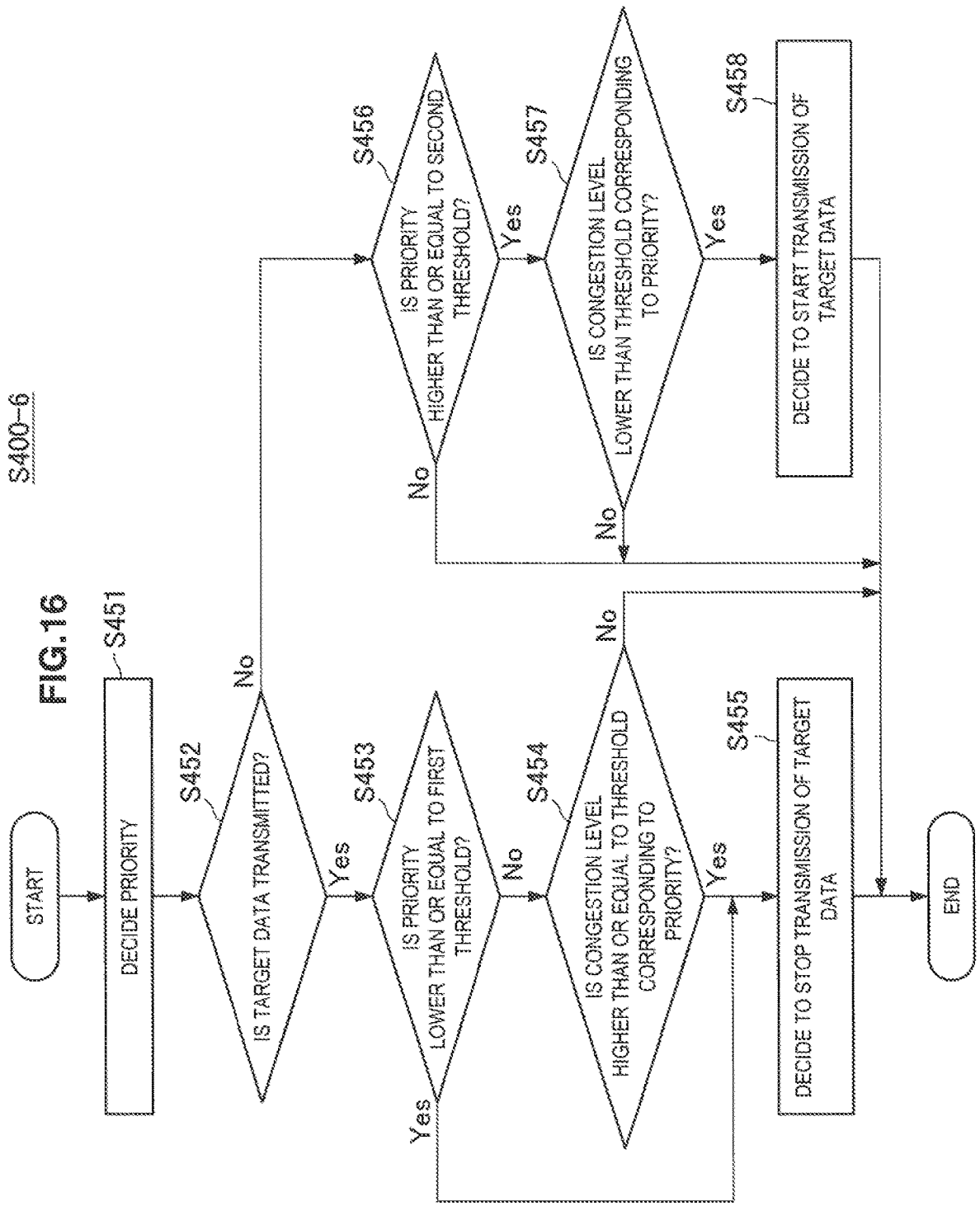
FIG. 16 is a flowchart illustrating a first example of a schematic procedure of a third example of data transmission control in a second modified example of the first embodiment.

FIG. 16 is a flowchart illustrating a first example of a schematic procedure of a third example of the data transmission control in the second modified example of the first embodiment.

Additionally, steps S451, S452, S453, S455, S456, and S458 in the example of FIG. 16 are the same as steps S431 to S436 in the example of FIG. 13. Steps S454 and S457, and the related steps in the example of FIG. 16 will be thus described here.

When the target data has been transmitted (S452: YES) and the priority is higher than a first threshold (e.g. 1) (S453: NO), the communication control section 164 determines whether the congestion level is higher than or equal to than the threshold corresponding to the priority (S454). If the congestion level is higher than or equal to the threshold (S454: YES), the communication control section 164 decides to stop the transmission of the target data (S455). The processing is then finished. If the congestion level is lower than the threshold (S454: NO), the processing is then finished.

If the target data has not been transmitted (S452: NO) and the priority is higher than or equal to a second threshold (e.g. 3) (S456: YES), the communication control section 164 determines whether the congestion level is lower than the threshold corresponding to the priority (S457). If the congestion level is lower than the threshold (S457: YES), the communication control section 164 decides to start the transmission of the target data (S458). The processing is then finished. If the congestion level is higher than or equal to the threshold (S457: NO), the processing is then finished.

SECOND EXAMPLE

Figure 17:
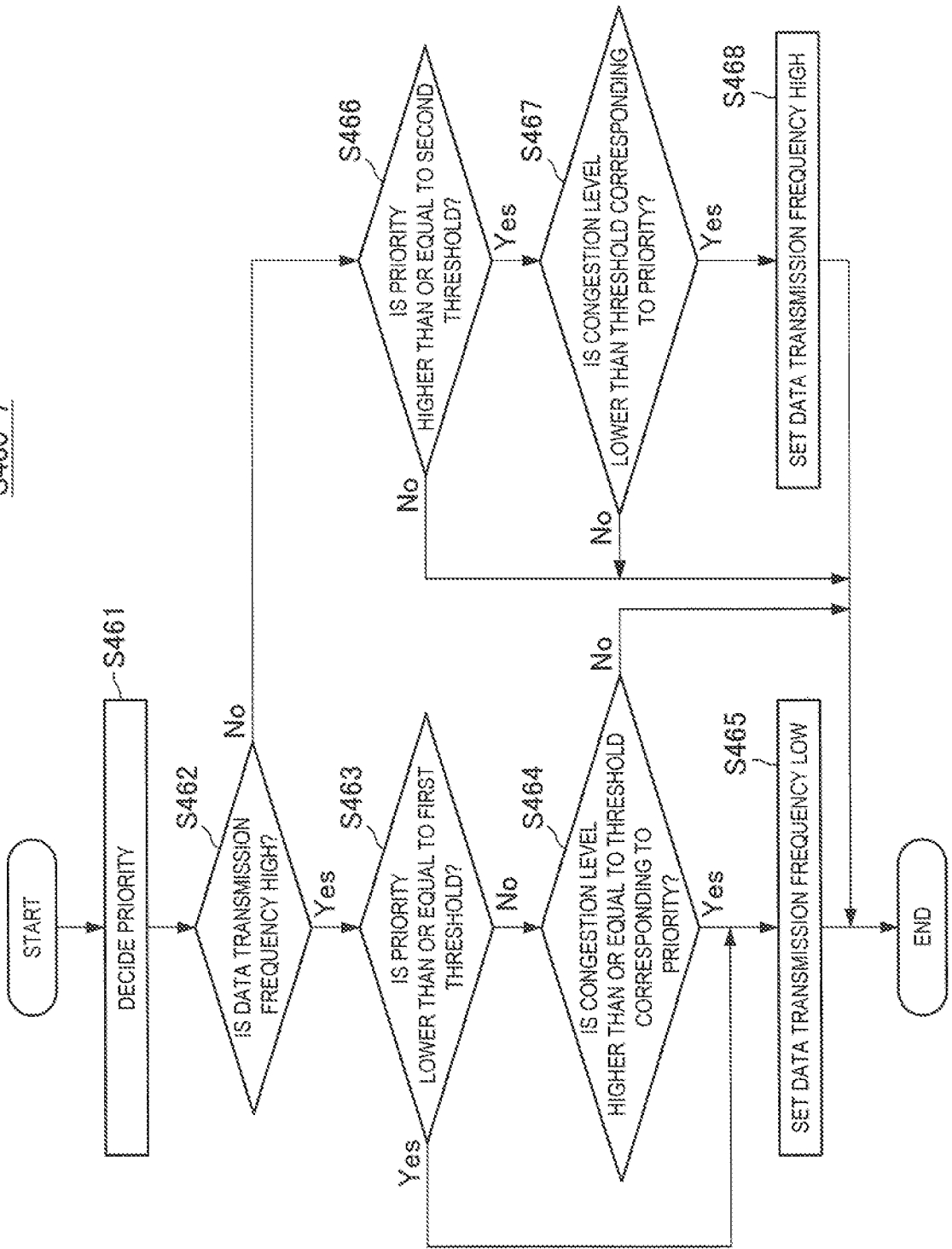
FIG. 17 is a flowchart illustrating a second example of the schematic procedure of the third example of the data transmission control in the second modified example of the first embodiment.

FIG. 17 is a flowchart illustrating a second example of the schematic procedure of the third example of the data transmission control in the second modified example of the first embodiment.

Additionally, steps S461, S462, S463, S465, S466, and S468 in the example of FIG. 17 are the same as steps S441 to S446 in the example of FIG. 14. Steps S464 and S467, and the related steps in the example of FIG. 17 will be thus described here.

If the data transmission frequency is high (S462: YES) and the priority is higher than a first threshold (e.g. 1) (S463: NO), the communication control section 164 determines whether the congestion level is higher than or equal to the threshold corresponding to the priority (S464). If the congestion level is higher than or equal to the threshold (S464: YES), the communication control section 164 sets the data transmission frequency low (S465). The processing is then finished. If the congestion level is lower than the threshold (S464: NO), the processing is then finished.

If the data transmission frequency is low (S462: NO) and the priority is higher than or equal to a second threshold (e.g. 3) (S466: YES), the communication control section 164 determines whether the congestion level is lower than the threshold corresponding to the priority (S467). If the congestion level is lower than the threshold (S467: YES), the communication control section 164 sets the data transmission frequency high (S468). The processing is then finished. If the congestion level is higher than or equal to the threshold (S467: NO), the processing is then finished.

The second modified example of the first embodiment has been described so far. The first modified example may also be applied to the second modified example. That is, the communication quality related information may include the communication speed information, and the data transmission control may also be performed on the basis of the communication speed information in the second modified example.

2.5.3. Third Modified Example

Next, a third modified example of the first embodiment will be described. The communication quality related information (i.e. information related to the communication quality of a wireless channel through which target data to be distributed to the terminal apparatus 100 is transmitted to the terminal apparatus 100) includes communication quality information indicating the communication quality of the wireless channel in the examples of the first embodiment as discussed above.

The communication quality related information further includes communication system information related to a communication system responsible for the transmission of the target data to the terminal apparatus 100 through a wireless channel in the third modified example of the first embodiment.

(Terminal Apparatus 100: Communication Quality Related Information Generating Section 161)
Communication System Information The communication quality related information further includes communication system information related to a communication system responsible for the transmission of the target data to the terminal apparatus 100 through a wireless channel in the third modified example. The communication system information, for example, indicates at least one of a communication scheme to be adopted, a duplex scheme to be adopted, and the bandwidth of a frequency band to be used or the number of frequency bands to be used.

The communication system information, for example, indicates a communication scheme to be adopted from various communication schemes such as LTE, LTE-Advanced, wideband code division multiple access (WCDMA) (registered trademark), EV-DO, and WiMAX.

For example, the communication system information further indicates a duplex scheme to be adopted such as frequency division duplex (FDD) and time division duplex (TDD). When TDD is adopted, the communication system information may further indicate a ratio of an uplink to a downlink in TDD.

The communication system information, for example, indicates a bandwidth of 5 MHz, 10 MHz, 15 MHz, 20 MHz, or the like. When carrier aggregation is adopted, the communication system information also indicates the number of component carriers (CCs).

(Terminal Apparatus 100: Communication Control Section 164)

The communication control section 164 performs the data transmission control on the basis of the communication quality related information including the communication system information and the accumulated data information in the third modified example.

Specifically, the communication control section 164 performs the data transmission control on the basis of, for example, the communication quality information, the data amount information, and the communication system information.

First Example Case of Data Transmission Control

For example, as described as the first example of the data transmission control, the communication control section 164 decides to start or stop the transmission of the target data to the terminal apparatus 100. In this case, when information indicated by the communication system information, for example, satisfies a condition of systems having high communication speed, a decision to start the transmission is more likely to be made, while a decision to stop the transmission is less likely to be made. To the contrary, when information indicated by the communication system information does not satisfy a condition of systems having high communication speed, a decision to start the transmission is less likely to be made, while a decision to stop the transmission is more likely to be made. That is, the transmission in a system having high communication speed is prioritized. As an example, a threshold used to decide to start and stop the transmission is decided on the basis of the communication system information.

Second Example Case of Data Transmission Control

For example, as described as the second example of the data transmission control, the communication control section 164 sets the frequency (i.e. data transmission frequency) of the transmission of the target data to the terminal apparatus 100. In this case, when information indicated by the communication system information, for example, satisfies a condition of systems having high communication speed, the data transmission frequency is more likely to be set high, but less likely to be low. To the contrary, when information indicated by the communication system information does not satisfy a condition of systems having high communication speed, the data transmission frequency is less likely to be set high, but more likely to be set low. As an example, a threshold used to set the data transmission frequency is dynamically decided in accordance with the congestion level.

Third Example Case of Data Transmission Control

For example, as described as the third example of the data transmission control, the communication control section 164 decides the priority of the transmission of the target data to the terminal apparatus 100 through the wireless channel. In this case, when information indicated by the communication system information, for example, satisfies a condition of systems having high communication speed, higher priority is decided. To the contrary, when information indicated by the communication system information does not satisfy a condition of systems having high communication speed, lower priority is decided.

As discussed above, the communication system information is used in the third modified example. This may, for example, improve the transmission efficiency of the wireless channel. Accordingly, it is possible to reduce loads on the wireless network.

(Processing Procedure)

First Example Case of Data Transmission Control

When the first example of the data transmission control is used, the data control processing in the third modified example is the same as the example described with reference to FIG. 8 except that a threshold is, for example, decided on the basis of the communication system information.

Second Example Case of Data Transmission Control

When the second example of the data transmission control is used, the data control processing in the third modified example is the same as the example described with reference to FIG. 9 except that a threshold is, for example, decided on the basis of the communication system information.

Third Example Case of Data Transmission Control

When the third example of the data transmission control is used, the data control processing in the third modified example, is the same as the examples described with reference to FIGS. 12 to 14 except that the priority is, for example, decided further on the basis of the communication system information.

The third modified example of the first embodiment has been described so far. The first modified example and/or the second modified example may also be applied to the third modified example. That is, the communication quality related information may include the communication speed information and/or the congestion information, and the data transmission control may also be performed on the basis of the communication speed information and/or the congestion information in the third modified example.

2.5.5. Fourth Modified Example

Next, a fourth modified example of the first embodiment will be described. The accumulated data related information (i.e. information related to accumulated data among the target data to be distributed to the terminal apparatus 100) includes data amount information indicating the amount of accumulated data in the examples of the first embodiment as discussed above.

Meanwhile, the accumulated data related information includes time information indicating a time period necessary for the terminal apparatus 100 to process the accumulated data instead of the data amount information or in combination with the data amount information in the fourth modified example of the first embodiment.

(Terminal Apparatus 100: Accumulated Data Related Information Generating Section 162)

Time Information

The accumulated data related information includes time information indicating a time period necessary for the terminal apparatus 100 to process the accumulated data (i.e. data accumulated in the terminal apparatus 100 among the target data to be distributed to the terminal apparatus 100) in the fourth modified example.

The accumulated data related information generating section 162, for example, refers to the buffer of the storage unit 130 to calculate the amount of accumulated data. Moreover, the accumulated data related information generating section 162 acquires serial processing information related to serial processing on the target data, and calculates a time period necessary for the terminal apparatus 100 to process the accumulated data on the basis of the serial processing information and the accumulated data amount.

As an example, the target data is moving image data, and the serial processing information includes information such as file formats, types of codec, and resolution. The accumulated data related information generating section 162, for example, calculates an average bit-rate for reproduction on the basis of the serial processing information. The accumulated data related information generating section 162 then calculates a time period necessary for the terminal apparatus 100 to reproduce the accumulated data, on the basis of the average bit-rate and the amount of accumulated data.

This time information indicates how urgently data is transmitted, so that the time information may be used in the same way as the data amount information. Specifically, a larger amount of accumulated data means that a longer time period is necessary for the terminal apparatus 100 to reproduce the accumulated data, while a smaller amount of accumulated data means that a shorter time period is necessary for the terminal apparatus 100 to reproduce the accumulated data.

(Terminal Apparatus 100: Communication Control Section 164)

The communication control section 164 performs the data transmission control on the basis of the accumulated data related information including the time information and the communication quality related information in the fourth modified example.

Specifically, the communication control section 164 performs the data transmission control on the basis of, for example, the communication quality information and the time information. That is, the communication control section 164 uses the communication quality information and the data amount information in performing the data transmission control in the examples as discussed above, but uses, for example, the time information instead of the data amount information in the fourth modified example. Needless to say, the communication control section 164 may use not only the data amount information, but also the time information in performing the data transmission control. The communication control section 164 may perform the data transmission control on the basis of, for example, the communication quality information, the data amount information, and the time information.

As discussed above, the time information is used in the first modified example. This time information makes it possible, for example, to know how urgently data is transmitted. For example, the transmission of the target data to the terminal apparatus 100 may be appropriately controlled.

(Processing Procedure)

The data transmission control in the fourth modified example is the same as the examples described with reference to FIGS. 8, 9, and 12 to 14 except that a time period (time information) for the terminal apparatus 100 to process the accumulated data is, for example, used instead of the amount of accumulated data (data amount information).

The fourth modified example of the first embodiment has been described so far. The first modified example, the second modified example, and/or the third modified example may also be applied to the fourth modified example. That is, the communication quality related information may include the communication speed information, the congestion information, and/or the communication system information, and the data transmission control may also be performed on the basis of the communication speed information, the congestion information, and/or the communication system information in the fourth modified example.

2.5.5. Fifth Modified Example

Next, a fifth modified example of the first embodiment will be described.

When the communication quality of a wireless channel through which the target data to be distributed to the terminal apparatus 100 is transmitted to the terminal apparatus 100 is not satisfactory, a user of the terminal apparatus 100 is notified of the communication quality in the fifth modified example of the first embodiment. A screen is displayed to notify the user.

(Display Control Section 167)

Notification of Communication Quality

When the communication quality of a wireless channel through which the target data to be distributed to the terminal apparatus 100 is transmitted to the terminal apparatus 100 is not satisfactory, the display control section 167 controls display of a screen for notifying a user of the terminal apparatus 100 of the communication quality in the fifth modified example. The display control section 167, for example, generates a screen for the notification and causes the display unit 150 to display the screen.

Determination about whether Communication Quality is Satisfactory

For example, the communication quality information is used for determining whether the communication quality of a wireless channel is satisfactory. Determining whether the communication quality is satisfactory is, for example, determining whether a value indicated by the communication quality information is greater than or equal to (or less than or equal to) a threshold. The processing unit 160 (e.g. function of the display control section 167, the communication control section 164, or the like) makes the determination, for example. The threshold may be varied by a user's instruction.

Additionally, the congestion information described in the second modified example may also be used instead of the communication quality information or in combination with the communication quality information. That is, the determination may be made on the basis of the congestion information.

The determination may be made on the basis of a predicted value of the communication speed calculated with the communication quality information and/or the congestion information. In this case, the determination may mean determining whether the predicted value is greater than or equal to a threshold.

Timing of Screen Display

The screen for the notification is displayed, for example, when an application for distributing the target data is activated. That is, when the application is activated, it is determined whether the communication quality of a wireless channel is satisfactory. If it is determined that the communication quality is not satisfactory, the screen for the notification is displayed.

Content of Screen

The screen for notifying a user of the terminal apparatus 100 of the communication quality includes, for example, information indicating that the communication quality is not satisfactory. The screen also includes, for example, information that allows a user to choose whether to distribute the target data. A specific example of the screen will be described below with reference to FIG. 18.

Figure 18:
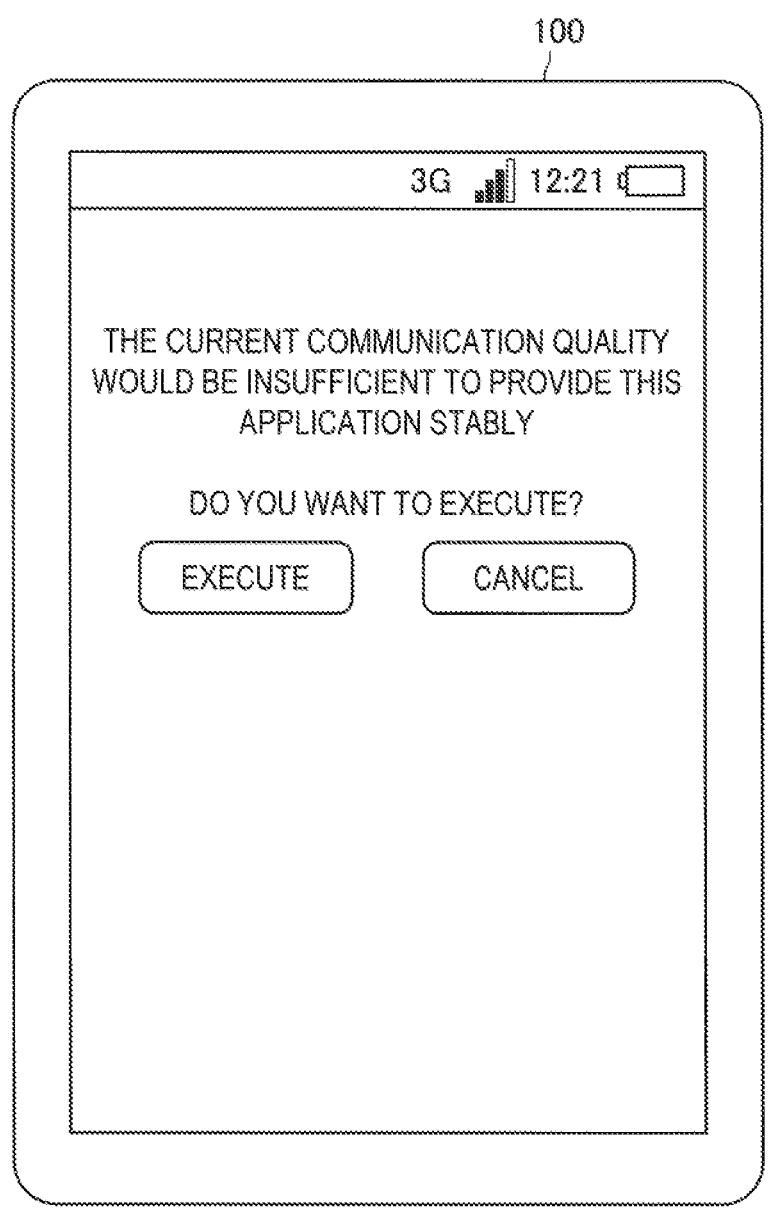
FIG. 18 is an explanatory diagram for describing an example of a screen for notifying a user of a terminal apparatus of communication quality.

FIG. 18 is an explanatory diagram for describing an example of a screen for notifying a user of the terminal apparatus 100 of the communication quality. FIG. 18 illustrates the terminal apparatus 100. A screen displayed on the display (display unit 150) of the terminal apparatus 100 includes information indicating that the communication quality is not satisfactory, such as "the current communication quality would be insufficient to provide this application stably." The screen also includes information that allows a user to choose whether to distribute the target data, such as "do you want to execute?," "execute," and "cancel."

The screen for the notification is, for example, displayed as discussed above. A user of the terminal apparatus 100 may choose to distribute the target data in accordance with the information that allows the user to choose whether to distribute the target data. The communication control section 164, for example, performs the data transmission control in this case. A user of the terminal apparatus 100 may also choose not to distribute the target data. In this case, for example, the communication control section 164 does not perform the data transmission control, and the application is finished.

A screen for notifying a user of the terminal apparatus 100 of the communication quality is displayed as discussed above. This may, for example, improve the user convenience.

3. SECOND EMBODIMENT

Next, a second embodiment of the present disclosure will be described with reference to FIGS. 19 to 22.

According to the second embodiment of the present disclosure, a control entity different from a terminal apparatus controls the transmission of target data to be distributed to the terminal apparatus. More specifically, the control entity controls the transmission of the target data to the terminal apparatus on the basis of first information (i.e. communication quality related information) related to the communication quality of a wireless channel through which the target data is transmitted to the terminal apparatus, and second information (i.e. accumulated data related information) related to data among the target data, the data being accumulated in the terminal apparatus.

This makes it possible to reduce loads on wireless networks while, for example, preventing the quality of data distribution services from degrading.

3.1. SCHEMATIC CONFIGURATION OF COMMUNICATION SYSTEM

Figure 19:
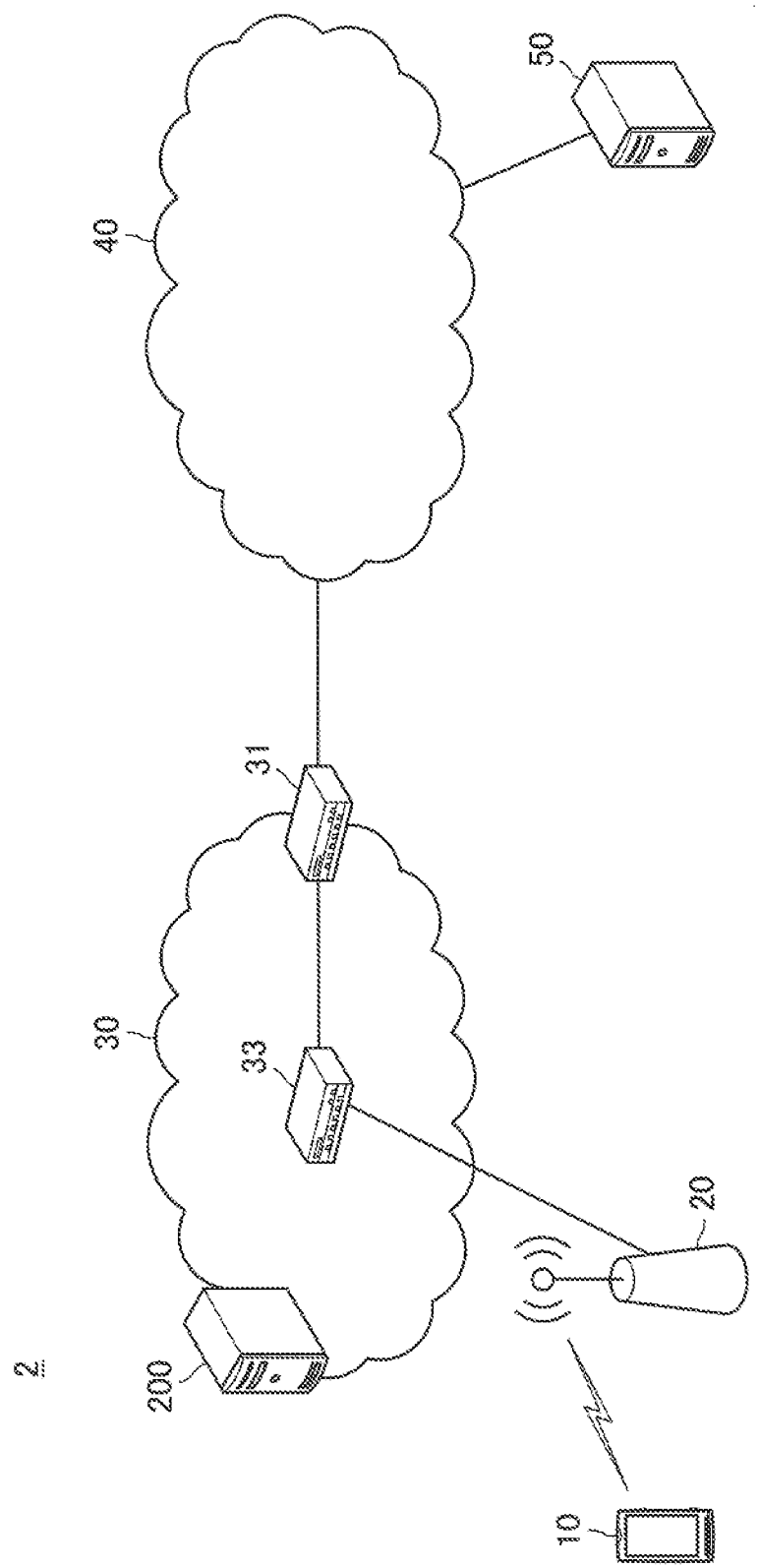
FIG. 19 is an explanatory diagram illustrating an example of a schematic configuration of a communication system according to a second embodiment of the present disclosure.

First of all, a schematic configuration of a communication system 2 according to the second embodiment of the present disclosure will be described with reference to FIG. 19. FIG. 19 is an explanatory diagram illustrating an example of the schematic configuration of the communication system 2 according to the second embodiment of the present disclosure. FIG. 19 shows that the communication system 2 includes a terminal apparatus 10, a base station 20, a first gateway 31, a second gateway 33, a data distribution apparatus 50, and a control entity 200.

The terminal apparatus 10 wirelessly communicates with the base station 20 when the terminal apparatus 10 is positioned within the communication area (i.e. cell) of the base station 20. For example, the base station 20 transmits information (control information and data) to the terminal apparatus 10 through a wireless channel, and the terminal apparatus 10 receives the information. To the contrary, the terminal apparatus 10 transmits information (control information and data) to the base station 20 through a wireless channel, and the base station 20 receives the information. For example, each of the wireless channels is one or more frequency bands. As an example, each of the wireless channels is one or more component carriers (CC).

In addition, the terminal apparatus 10 communicates with the data distribution apparatus 50 via the base station 20, a core network 30, and a public network 40. The data distribution apparatus 50 distributes data. For example, the data distribution apparatus 50 distributes data to the terminal apparatus 10 via the public network 40, the core network 30, and the base station 20. Specifically, target data to be distributed to a terminal apparatus is transmitted from the data distribution apparatus 50 to the first gateway 31, for example, via the public network 40. The first gateway 31 is a node that connects the core network 30 to the public network 40, and is referred to as P-GW, for example, in LTE. The target data is then transmitted further from the first gateway 31 to the second gateway 33. The second gateway 33 is a node that relays data, and is referred to as S-GW, for example, in LTE. Furthermore, the target data is transmitted from the second gateway 33 to the base station 20. The target data is thereafter transmitted to the terminal apparatus 10 by the base station 20 through a wireless channel.

The target data is, for example, content data. As an example, the target data is moving image data. The data distribution apparatus 50 distributes the target data to the terminal apparatus 10 in a streaming manner, for example.
Control Entity 200

The control entity 200 controls the transmission of the target data to the terminal apparatus 10 in the second embodiment in particular, the target data being to be distributed to the terminal apparatus 10. As illustrated in FIG. 19, the control entity 200 is, for example, a core network node different from the first gateway 31 and the second getaway 33.

The control entity 200 according to the second embodiment is not limited to the examples as discussed above. The control entity 200 may be, for example, the first gateway 31 and the second gateway 33 instead of the core network node. The control entity 200 may be not the core network node, but the base station 20. The control entity 200 may also be a node that is not included in a mobile communication network. The control entity 200 may be, for example, a node that is connected to the core network 30 via the public network 40. The function of the control entity 200 may be implemented in the data distribution apparatus 50.

3.2. CONFIGURATION OF CONTROL ENTITY 200

Figure 20:
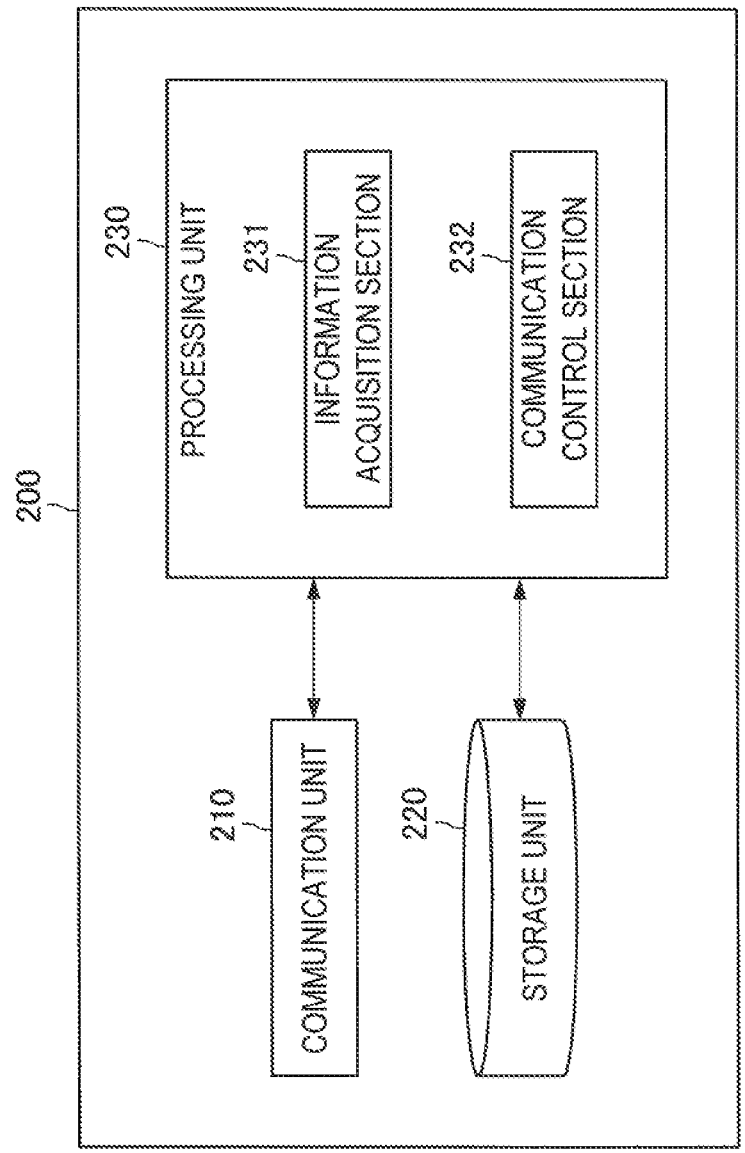
FIG. 20 is a block diagram illustrating an example of a configuration of a control entity according to the second embodiment.

First of all, an example of the configuration of the control entity 200 according to the second embodiment will be described with reference to FIG. 20. FIG. 20 is a block diagram illustrating the example of the configuration of the control entity 220 according to the second embodiment. FIG. 20 shows that the control entity 200 includes a communication unit 210, a storage unit 220, and a processing unit 230.
(Communication Unit 210)

The communication unit 210 communicates with another node. The communication unit 210 communicates with, for example, the base station 20, the first gateway 31, and/or the second gateway 33. The communication unit 210 also communicates with, for example, the terminal apparatus 10 via the base station 20. The communication unit 210 may also communicate with, for example, the data distribution apparatus 50 via the public network 40.
(Storage Unit 220)

The storage unit 220 temporarily or persistently stores a program and data for the operation of the control entity 200.
(Processing Unit 230)

The processing unit 230 provides a variety of functions of the control entity 200. The processing unit 230 includes an information acquisition section 231 and a communication control section 232.
(Information Acquisition Section 231)
Communication Quality Related Information The information acquisition section 231 acquires first information (i.e. communication quality related information) related to the communication quality of a wireless channel through which the target data to be distributed to the terminal apparatus 10 is transmitted to the terminal apparatus 10. The communication quality related information has been already described, for example, in the first embodiment.

The terminal apparatus 10, for example, generates the communication quality related information in the same way as the terminal apparatus 100 in the first embodiment. The terminal apparatus 10 provides the communication quality related information to any of the nodes (e.g. base station 20), the node providing the communication quality related information to the control entity 200. Alternatively, the terminal apparatus 10 may provide the communication quality related information to the control entity 200 via the base station 20. The communication quality related information is stored in the storage unit 220 of the control entity 200. The information acquisition section 231 then acquires the communication quality related information from the storage unit 220.

Additionally, the terminal apparatus 10 may use information as the communication quality related information, the information being provided to the base station 20 or a core network (e.g. mobility management node (MME)). The base station 20 or the core network may provide the information to the control entity 200 in this case. This information may be, for example, RSCP, RSRP, or RSRQ included in a measurement report, or CQI or data rate control (DRC) that is an indicator of the quality of a transmission channel used for adaptive modulation and coding (AMC), which is link adaptation.

The communication quality related information may include information generated by a network node such as the base station 20 and the core network node instead of information generated by the terminal apparatus 10 or in combination with the information. As an example, a network node (e.g. base station 20) may measure the communication quality of a wireless channel, and communication quality information indicating the communication quality may be included in the communication quality related information.
Accumulated Data Related Information The information acquisition section 231 acquires second information (i.e. accumulated data related information) related to data (i.e. accumulated data) among the target data, the data being accumulated in the terminal apparatus 10. The accumulated data related information has been already described, for example, in the first embodiment. For example, the terminal apparatus 10 generates the accumulated data related information in the same way as the terminal apparatus 100 in the first embodiment. The terminal apparatus 10 then provides the accumulated data related information to a node, and the node provides the accumulated data related information to the control entity 200. Alternatively, the terminal apparatus 10 may provide the accumulated data related information to the control entity 200 via the base station 20. The accumulated data related information is then stored in the storage unit 220 of the control entity 200. The information acquisition section 231 acquires the accumulated data related information from the storage unit 220.

The accumulated data related information may include information generated by a network node such as the base station 20 and the core network node instead of information generated by the terminal apparatus 10 or in combination with the information. As an example, a network node may estimate the amount of accumulated data in the terminal apparatus 10, and estimated data amount information indicating the estimated amount may be included in the accumulated data amount information.

(Communication Control Section 232)

The communication control section 232 performs control over the transmission of the target data to the terminal apparatus 10 (i.e. data transmission control) on the basis of the communication quality related information and the accumulated data related information. Additionally, an example of the data transmission control will be described below in detail.

3.3. PROCESSING PROCEDURE

Figure 21:
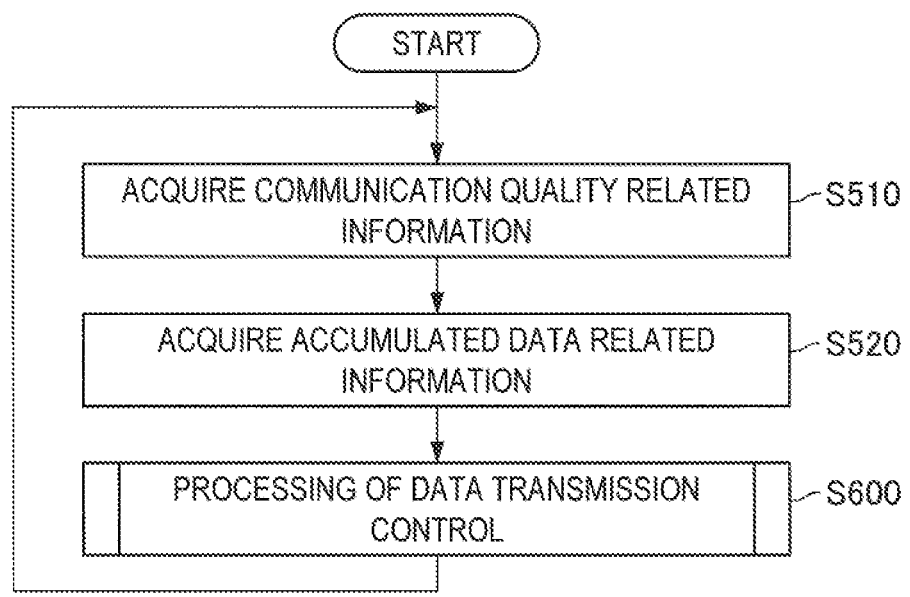
FIG. 21 is a flowchart illustrating an example of a schematic procedure of communication control processing according to the second embodiment.

Next, an example of communication control processing according to the second embodiment will be described with reference to FIG. 21. FIG. 21 is a flowchart illustrating an example of a schematic procedure of the communication control processing according to the second embodiment.

The information acquisition section 231 acquires communication quality related information (S510). The communication quality related information is related to the communication quality of a wireless channel through which the target data to be distributed to the terminal apparatus 10 is transmitted to the terminal apparatus 10. The information acquisition section 231 also acquires accumulated data related information (S520). The accumulated data related information is related to data (i.e. accumulated data) among the target data, the data being accumulated in the terminal apparatus 10. The communication control section 232 then executes processing of data transmission control (S600). That is, the communication control section 232 performs control over the transmission of the target data to the terminal apparatus 10 (i.e. data transmission control) on the basis of the communication quality related information and the accumulated data related information.

3.4. EXAMPLE OF DATA TRANSMISSION CONTROL

Next, an example of the data transmission control will be described with reference to FIG. 22.

The data transmission control according to the second embodiment is substantially the same as, for example, the third example of the data transmission control described in the first embodiment.
(Control Entity 200: Communication Control Section 232)
Decision on Priority For example, the data transmission control includes deciding the priority of the transmission of the target data to the terminal apparatus 10 through a wireless channel through which the target data to be distributed to the terminal apparatus 10 is transmitted to the terminal apparatus 10. That is, the communication control section 232 decides the priority of the transmission through the wireless channel.

The decision on the priority in the second embodiment is the same as the decision on the priority (decision on the priority in the third example of the data transmission control) according to the first embodiment except that deciders are different, for example. Accordingly, the repeated explanation will be omitted here.

Additionally, the information acquisition section 231 may acquire the user request information, and the communication control section 232 may decide the priority further on the basis of the user request information in the second embodiment like the first embodiment.
Use of Priority For example, the priority is an indicator used for a node (i.e. transmission control node) that controls the transmission of data to each apparatus through the wireless channel to perform the control in the second embodiment. The control entity 200 provides information indicating the priority to the transmission control node in this case. As an example, the transmission control node is the base station 20. The base station 20, for example, performs scheduling for the wireless channel on the basis of the priority in this case. More specifically, higher priority, for example, causes the base station 20 to more preferentially allocate radio resources for the transmission of the target data to the terminal apparatus 10.

As another example, the transmission control node may also be the first gateway 31 or the second gateway 33. In this case, higher priority may cause the first gateway 31 or the second gateway 33 to more preferentially transfer the target data to be distributed to the terminal apparatus 10. As still another example, the transmission control node may be the data distribution apparatus 50. In this case, higher priority may cause the data distribution apparatus 50 to more preferentially transmit the target data to the terminal apparatus 10.

For example, the priority is decided and used as discussed above. This allows more data to be transmitted, for example, when the communication quality is satisfactory. Accordingly, the transmission efficiency is high, and the wireless network bears a lighter load. Since data can be more efficiently transmitted, it is possible to prevent the quality of data distribution services from degrading. For example, an enough amount of accumulated data may stop the transmission of data or may allow a smaller amount of data to be transmitted, resulting in a lighter load on the wireless network.

This makes it possible to reduce loads on wireless networks while, for example, preventing the quality of data distribution services from degrading.

When the control entity 200 is the base station 20, the first gateway 31, the second gateway 33, the data distribution apparatus 50, or the like, and the transmission control node, the control entity 200 may use the priority. That is, the control entity 200 may control the transmission of data to each apparatus through the wireless channel on the basis of the priority.

(Processing Procedure: Processing of Data Transmission Control)

Figure 22:
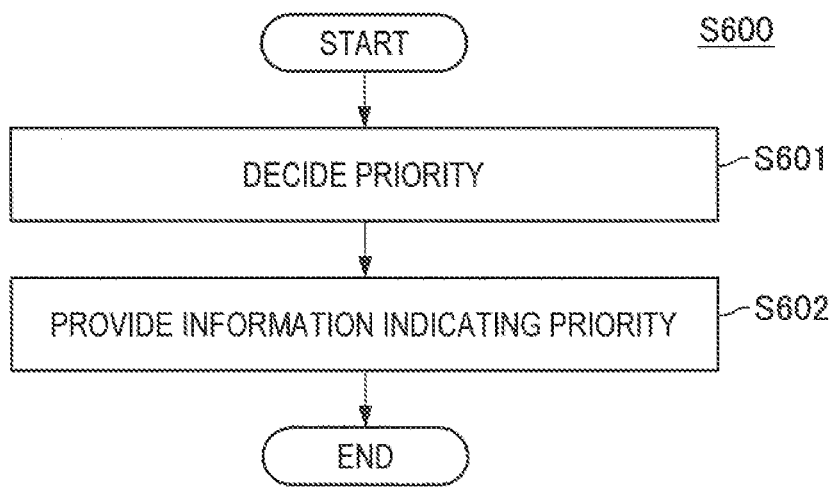
FIG. 22 is a flowchart illustrating an example of a schematic procedure of data transmission control according to the second embodiment.

FIG. 22 is a flowchart illustrating an example of a schematic procedure of the data transmission control according to the second embodiment.

First of all, the communication control section 232 decides the priority of the transmission of the target data to the terminal apparatus 10 through the wireless channel on the basis of the communication quality related information (e.g. communication quality information) and the accumulated data related information (e.g. data amount information) (S601). For example, the communication control section 232 decides the priority on the basis of the communication quality (e.g. CQI index) of the wireless channel and the amount of accumulated data.

The terminal apparatus 200 (e.g. communication control section 232) then provides information indicating the priority to a transmission control node (S602). The processing is then finished.

3.5. MODIFIED EXAMPLES

Next, modified examples of the second embodiment will be described. The same modified example as the first to fourth modified examples of the first embodiment may be applied to the second embodiment.

The communication quality related information may include communication speed information indicating the speed of the transmission of the target data to the terminal apparatus 10 instead of the communication quality information or in combination with the communication quality information in a first modified example of the second embodiment. The data transmission control may be performed on the basis of the communication speed information.

The communication quality related information further may include congestion information indicating a congestion level of the wireless channel in a second modified example of the second embodiment. The data transmission control may be performed further on the basis of the congestion information.

The communication quality related information may further include communication system information related to a communication system responsible for the transmission of the target data to the terminal apparatus 10 through a wireless channel in a third modified example of the second embodiment. The data transmission control may be performed further on the basis of the communication system information.

The accumulated data related information may include time information indicating a time period necessary for the terminal apparatus 10 to process the accumulated data instead of the data amount information or in combination with the data amount information in a fourth modified example of the second embodiment. The data transmission control may be performed on the basis of the time information.

Various kinds of information (communication speed information, congestion information, communication system information, and time information) in the modified examples may be each generated and provided by the terminal apparatus 10, or a network node.

Needless to say, two or more of the first to fourth modified examples of the second embodiment may be combined with each other.

4. APPLICATION EXAMPLES

The technology according to the present disclosure is applicable to a variety of products. The control entity 200 may be implemented as any type of server such as tower servers, rack servers, and blade servers. The control entity 200 may be a control module (e.g. integrated circuit module that includes a single die, or card or blade that is inserted into a slot of a blade server) mounted on a server.

When the control entity 200 is, for example, the base station 20, the control entity 200 may also be implemented as any type of evolved Node B (eNB) such as macro eNBs and small eNBs. Small eNBs may cover smaller cells than the macrocells of pico eNBs, micro eNBs, or home (femt) eNBs. Instead, the control entity 200 (base station 20) may be implemented as another type of base station such as eNodeBs and base transceiver stations (BTSs). The control entity 200 (base station 20) may include the main apparatus (which is also referred to as base station apparatus) that controls wireless communication and one or more remote radio heads (RRHs) that are arranged at different places from that of the main apparatus. Various types of terminal apparatus as discussed later may temporarily or semi-persistently execute the base station function to function as the control entity 200 (base station 20).

The terminal apparatus 100 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 100 may also be implemented as a terminal (which is also referred to as machine type communication (MTC) terminal) that performs machine to machine (M2M) communication. Furthermore, the terminal apparatus 100 may be a wireless communication module (e.g. integrated circuit module including a single die) that is mounted on these kinds of terminal.

4.1. APPLICATION EXAMPLES FOR CONTROL ENTITY

First Application Example

Figure 23:
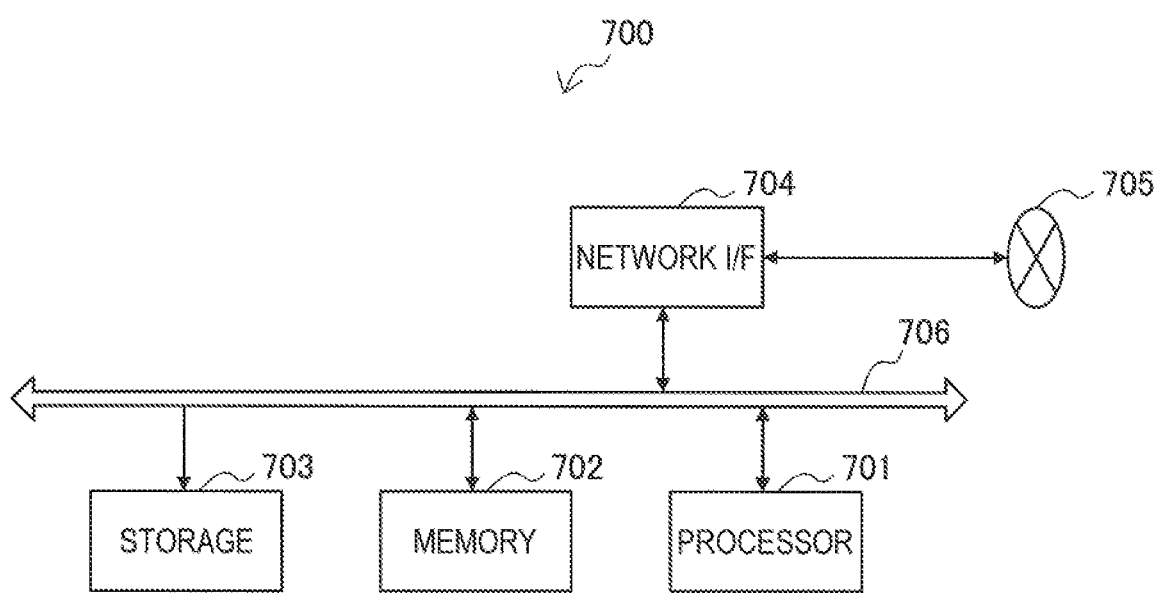
FIG. 23 is a block diagram illustrating an example of a schematic configuration of a server to which the technology according to the present disclosure may be applied.

FIG. 23 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes random access memory (RAM) and read only memory (ROM), and stores a program executed by the processor 701 and data. The storage 703 may include a storage medium such semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

The information acquisition section 231 and the communication control section 232 described with reference to FIG. 20 may be implemented by the processor 701 in the server 700 illustrated in FIG. 23. More specifically, these functions may be implemented by, for example, the processor 701 and a program executed by the processor 701 (or a memory having the program stored therein).

Second Application Example

Figure 24:
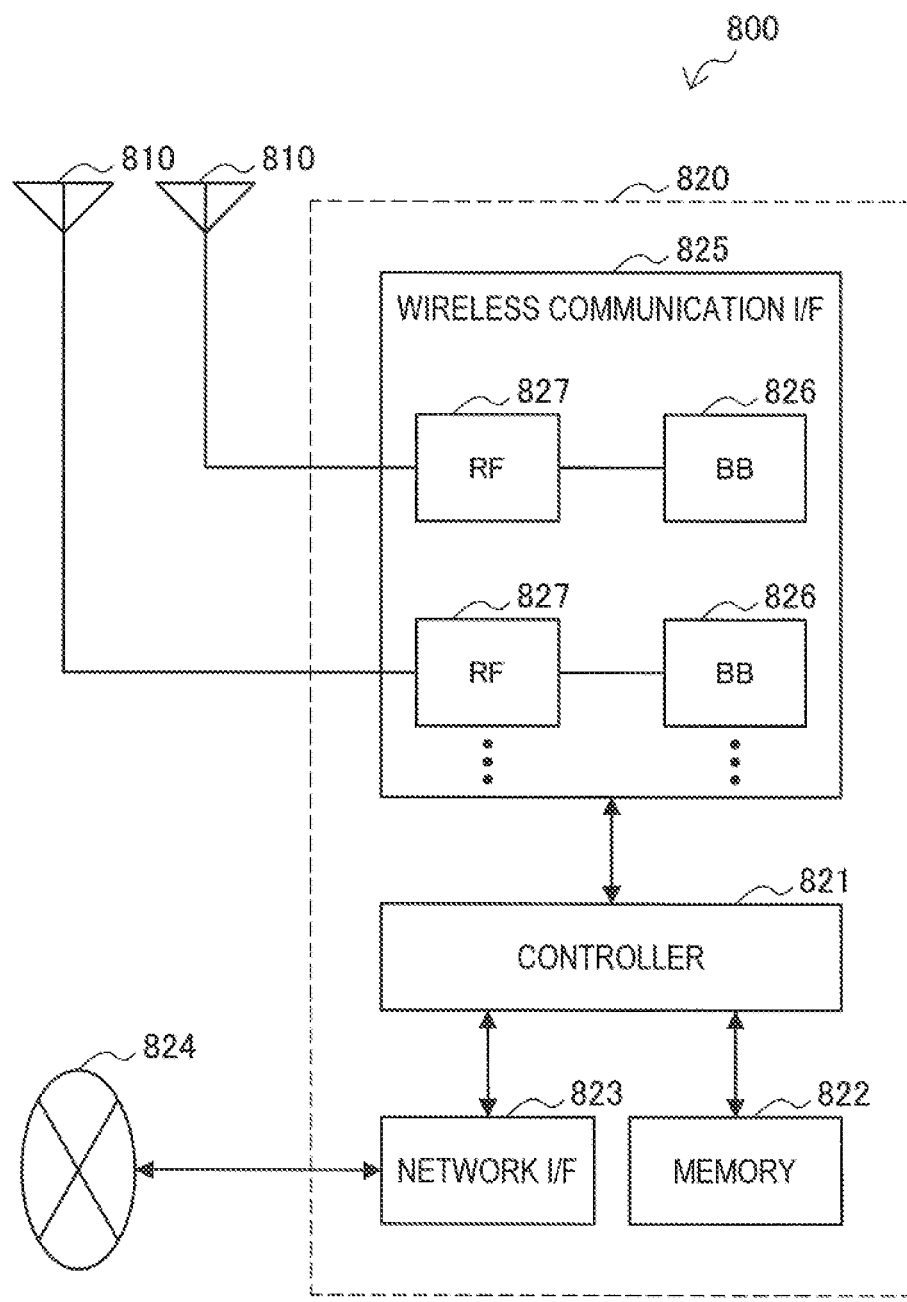
FIG. 24 is a block diagram illustrating a first example of a schematic configuration of an eNB to which the technology according to the present disclosure may be applied.

FIG. 24 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. antenna elements included in a MIMO antenna) and is used for the base station apparatus 820 to transmit and receive a wireless signal. The eNB 800 may include the plurality of the antennas 810 as illustrated in FIG. 24, and the plurality of antennas 810 may, for example, correspond to a plurality of frequency bands used by the eNB 800. FIG. 24 illustrates an example in which the eNB 800 includes the plurality of antennas 810, but the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes RAM and ROM, and stores a program executed by the controller 821 and a variety of control data (e.g. terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides a wireless connection to a terminal positioned within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have a part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a radio signal via the antenna 810.

The wireless communication interface 825 may include a plurality of the BB processors 826 as illustrated in FIG. 24, and the plurality of BB processors 826 may, for example, correspond to a plurality of frequency bands used by the eNB 800. The wireless communication interface 825 also may include a plurality of the RF circuits 827, as illustrated in FIG. 24, and the plurality of RF circuits 827 may, for example, correspond to a plurality of antenna elements. FIG. 24 illustrates an example in which the wireless communication interface 825 includes the plurality of BB processors 826 and the plurality of RF circuits 827, but the wireless communication interface 825 may include the single BB processor 826 or the single RF circuit 827.

Third Application Example

Figure 25:
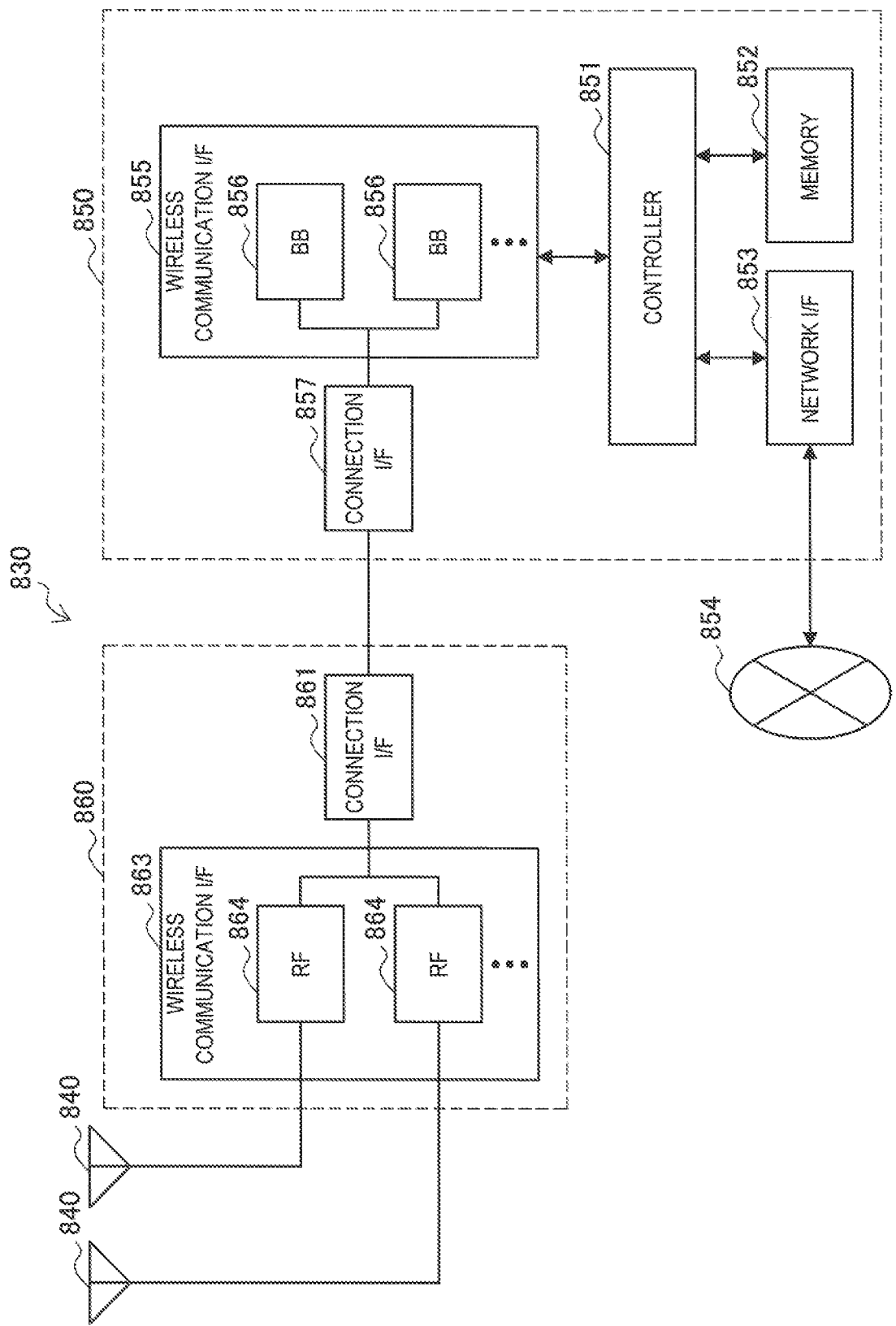
FIG. 25 is a block diagram illustrating a second example of the schematic configuration of the eNB to which the technology according to the present disclosure may be applied.

FIG. 25 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements included in a MIMO antenna), and is used for the RRH 860 to transmit and receive a wireless signal. The eNB 830 may include a plurality of the antennas 840 as illustrated in FIG. 25, and the plurality of antennas 840 may, for example, correspond to a plurality of frequency bands used by the eNB 830. FIG. 25 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 24.

The wireless communication interface 855 supports a cellular communication system such as LTE and LTE-Advanced, and provides a wireless connection to a terminal positioned in a sector corresponding to the RRH 860 via the RRH 860 and the antenna 840. The wireless communication interface 855 may typically include a BB processor 856. The BB processor 856 is the same as the BB processor 826 described with reference to FIG. 24 except that the BB processor 856 is connected to an RF circuit 864 of the RRH 860 via the connection interface 857. The wireless communication interface 855 may include a plurality of the BB processors 856, as illustrated in FIG. 25, and the plurality of BB processors 856 may, for example, correspond to a plurality of frequency bands used by the eNB 830 respectively. FIG. 25 illustrates an example in which the wireless communication interface 855 includes the plurality of BB processors 856, but the wireless communication interface 855 may include the single BB processor 856.

The connection interface 857 connects the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 connects the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 25, and the plurality of RF circuits 864 may, for example, correspond to a plurality of antenna elements. FIG. 25 illustrates an example in which the wireless communication interface 863 includes the plurality of RF circuits 864, but the wireless communication interface 863 may include the single RF circuit 864.

The information acquisition section 231 and the communication control section 232 described with reference to FIG. 20 may be implemented by the controller 821 and the controller 851 in the eNB 800 and the eNB 830 illustrated in FIGS. 24 and 25. More specifically, these functions may be, for example, implemented by the controller 821 and a program executed by the controller 821 (or a memory having the program stored therein), or the controller 851 or a program executed by the controller 851 (or a memory having the program stored therein). At least a part of these functions may be implemented by the wireless communication interface 825, and the wireless communication interface 855 and/or the wireless communication interface 863.

4.2. APPLICATION EXAMPLES FOR TERMINAL APPARATUS

First Application Example

Figure 26:
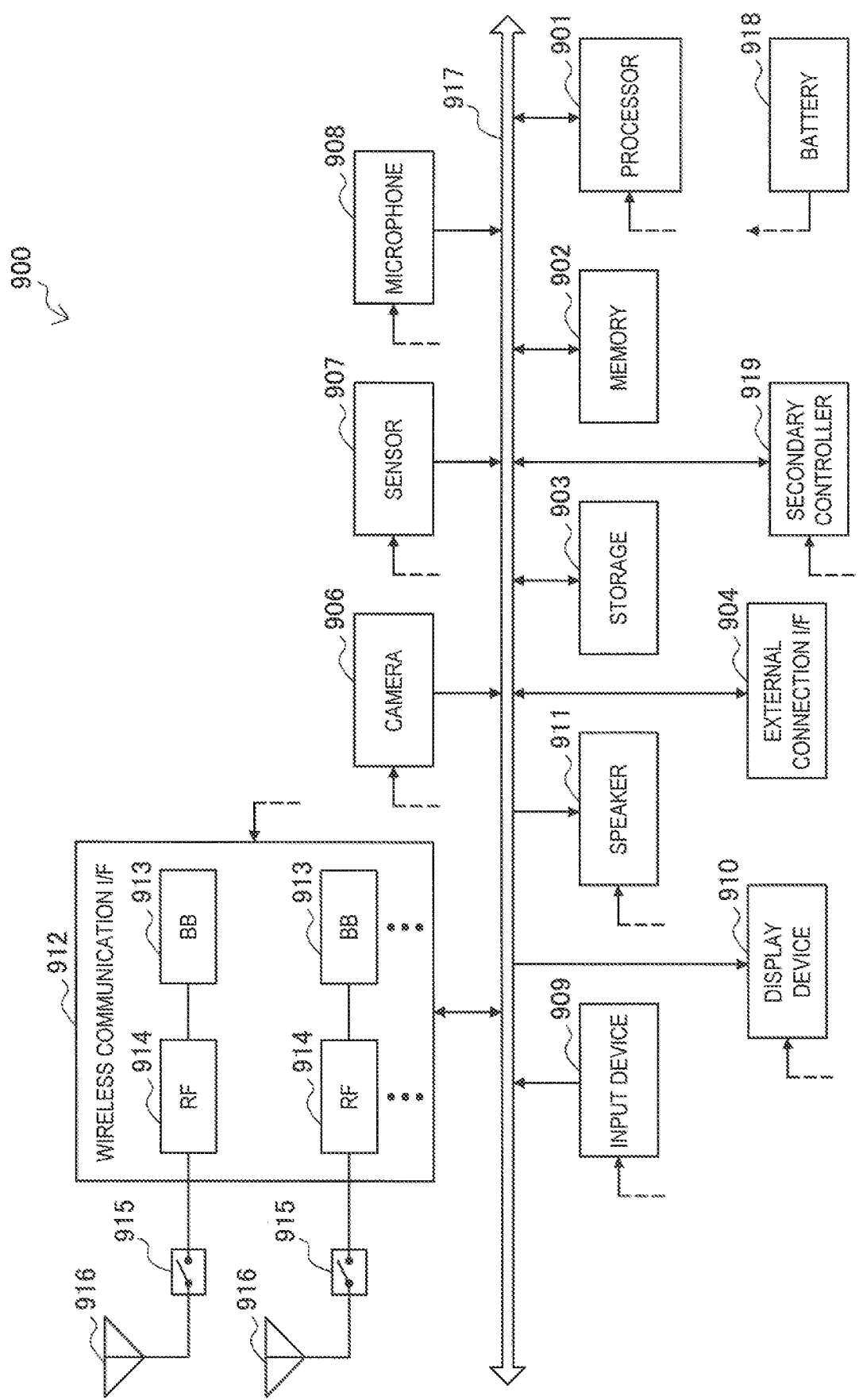
FIG. 26 is a block diagram illustrating an example of a schematic configuration of a smartphone to which the technology according to the present disclosure may be applied.

FIG. 26 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and another layer of the smartphone 900. The memory 902 includes RAM and ROM, and stores a program executed by the processor 901 and data. The storage 903 may include a storage medium such as semiconductor memories and hard disks. The external connection interface 904 connects the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE and LTE- Advanced, and performs wireless communication. The wireless communication interface 912 may typically include a BB processor 913 and an RF circuit 914. The BB processor 913 may, for example, perform encoding/decoding, modulation/demodulation, multiplexing/demultiplexing, and the like, and executes a variety of signal processing for wireless communication. Meanwhile, the RF circuit 914 may include a mixer, a filter, and an amplifier, and transmits and receives a wireless signal via the antenna 916. The wireless communication interface 912 may be a one-chip module having the BB processor 913 and the RF circuit 914 integrated thereon. The wireless communication interface 912 may include a plurality of BB processors 913 and a plurality of RF circuits 914 as illustrated in FIG. 26. FIG. 26 illustrates an example in which the wireless communication interface 912 includes the plurality of BB processors 913 and the plurality of RF circuits 914, but the wireless communication interface 912 may also include the single BB processor 913 or the single RF circuit 914.

Furthermore, the wireless communication interface 912 may support another type of wireless communication scheme such as short-distance wireless communication schemes, near field communication schemes and wireless local area network (LAN) schemes in addition to cellular communication systems, and in that case, the wireless communication interface 912 may include a BB processor 913 and an RF circuit 914 for each wireless communication scheme.

Each of the antenna switches 915 switches a plurality of circuits (e.g. circuits for different wireless communication schemes) included in the wireless communication interface 912 to which the antennas 916 connect.

Each of the antennas 916 includes a single or a plurality of antenna elements (e.g. antenna elements included in an MIMO antenna), and is used for the wireless communication interface 912 to transmit and receive a wireless signal. The smartphone 900 may include the plurality of antennas 916 as illustrated in FIG. 26. FIG. 26 illustrates an example in which the smartphone 900 includes the plurality of antennas 916, but the smartphone 900 may also include the single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 26 via a feeder line that is partially illustrated in the figure as a dashed line. The secondary controller 919, for example, operates a minimally necessary function of the smartphone 900 in a sleep mode.

The communication quality related information generating section 161, the accumulated data related information generating section 162, the information acquisition section 163, the communication control section 164, the distribution execution section 165, the serial processing section 166, the display control section 167, and the data management section 168 described with reference to FIG. 5 may be implemented by the processor 901 or the secondary controller 919 in the smartphone 900 illustrated in FIG. 26. More specifically, these functions may be implemented by, for example, the processor 901 or the secondary controller 919, and a program (e.g. application program and/or operating system (OS)) executed by the processor 901 or the secondary controller 919 (or a memory having the program stored therein). At least a part of these functions may be implemented by the wireless communication interface 912.

Second Application Example

Figure 27:
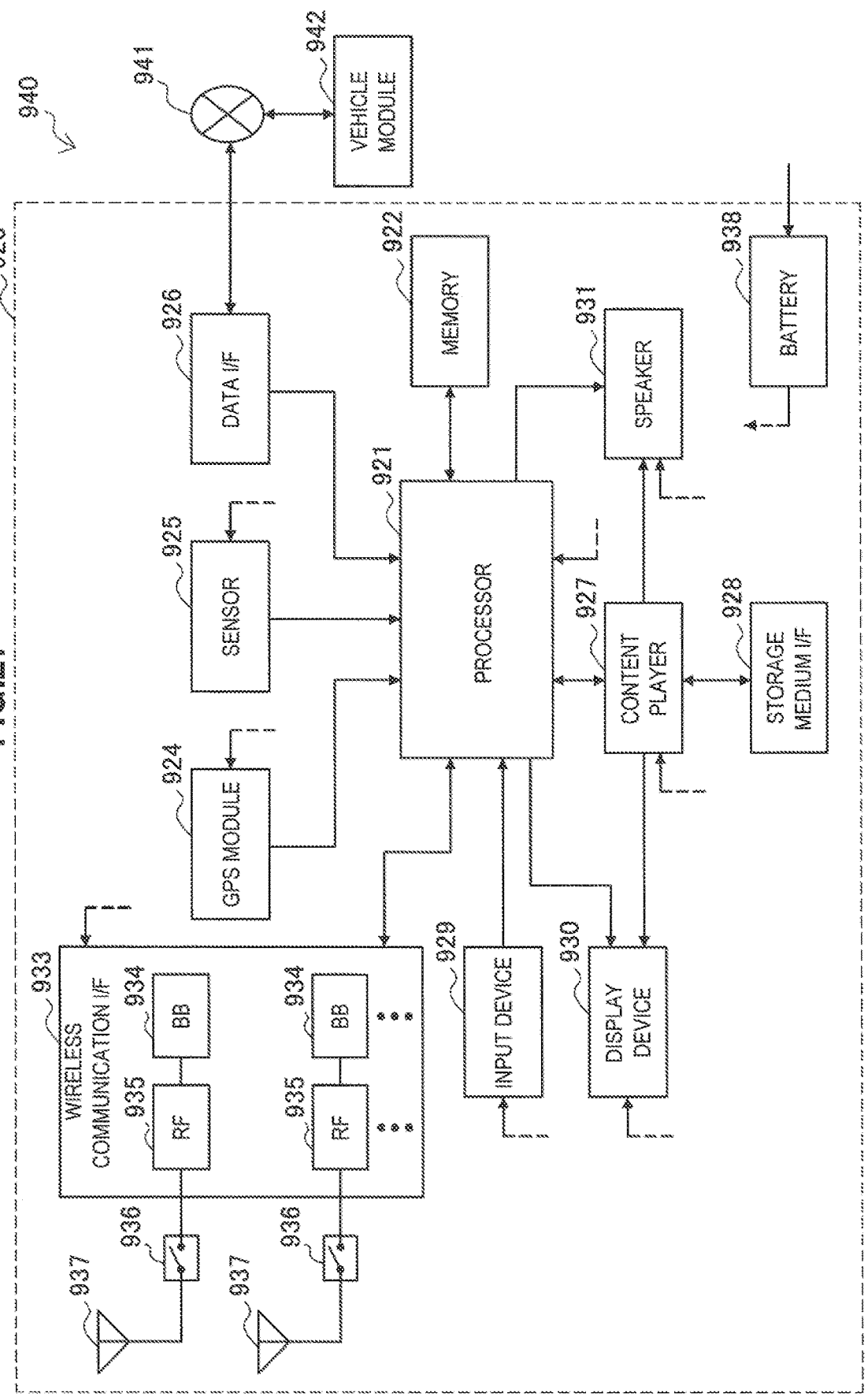
FIG. 27 is a block diagram illustrating an example of a schematic configuration of a car navigation apparatus to which the technology according to the present disclosure may be applied.

FIG. 27 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes RAM and ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not shown, and acquires data such as car speed data generated on the vehicle.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts an operation or an information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE and LTE-Advanced, and performs wireless communication. The wireless communication interface 933 may typically include a BB processor 934 and an RF circuit 935. The BB processor 934 may, for example, perform encoding/decoding, modulation/demodulation, multiplexing/demultiplexing, and the like, and executes a variety of signal processing for wireless communication. Meanwhile, the RF circuit 935 may include a mixer, a filter, and an amplifier, and transmits and receives a wireless signal via the antenna 937. The wireless communication interface 933 may be a one-chip module having the BB processor 934 and the RF circuit 935 integrated thereon. The wireless communication interface 933 may include a plurality of BB processors 934 and a plurality of RF circuits 935 as illustrated in FIG. 27. FIG. 27 illustrates an example in which the wireless communication interface 933 includes the plurality of BB processors 934 and the plurality of RF circuits 935, but the wireless communication interface 933 may also include the single BB processor 934 or the single RF circuit 935.

Furthermore, the wireless communication interface 933 may support another type of wireless communication scheme such as short-distance wireless communication schemes, near field communication schemes, and wireless LAN schemes in addition to cellular communication systems, and in that case, the wireless communication interface 912 may include the BB processor 934 and the RF circuit 935 for each wireless communication scheme.

Each of the antenna switches 936 switches a plurality of circuits (e.g. circuits for different wireless communication schemes) included in the wireless communication interface 933 to which the antennas 937 connect.

Each of the antennas 937 includes a single or a plurality of antenna elements (e.g. antenna elements included in an MIMO antenna), and is used for the wireless communication interface 933 to transmit and receive a wireless signal. The car navigation apparatus 920 may include the plurality of antennas 937 as illustrated in FIG. 27. FIG. 27 illustrates an example in which the car navigation apparatus 920 includes the plurality of antennas 937, but the car navigation apparatus 920 may also include the single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies electric power to each block of the car navigation apparatus 920 illustrated in FIG. 27 via a feeder line that is partially illustrated in the figure as a dashed line. The battery 938 accumulates the electric power supplied from the vehicle.

The communication quality related information generating section 161, the accumulated data related information generating section 162, the information acquisition section 163, the communication control section 164, the distribution execution section 165, the serial processing section 166, the display control section 167, and the data management section 168 described with reference to FIG. 5 may be implemented by the processor 921 in the car navigation apparatus 920 illustrated in FIG. 27. More specifically, these functions may be implemented by, for example, the processor 921, and a program (e.g. application program and/or OS) executed by the processor 921 (or a memory having the program stored therein). At least a part of these functions may be implemented by the wireless communication interface 933.

The technology according to the present disclosure may be implemented as an in-vehicle system (or vehicle) 940 including one or more blocks of the car navigation apparatus 920, the in-vehicle network 941, and a vehicle module 942. The vehicle module 942 generates vehicle data such as car speed, engine speed, and trouble information, and outputs the generated data to the in-vehicle network 941.

5. CONCLUSION

Each apparatus and each processing according to the embodiments of the present disclosure have been described so far with reference to FIGS. 1 to 27. According to an embodiment of the present disclosure, communication quality related information related to the communication quality of a wireless channel through which target data to be distributed to a terminal apparatus is transmitted to the terminal apparatus, and accumulated data related information related to data among the target data are acquired, the data being accumulated in the terminal apparatus. The transmission of the target data to the terminal apparatus is controlled on the basis of the communication quality related information and the accumulated data related information. This makes it possible to reduce loads on wireless networks while, for example, preventing the quality of data distribution services from degrading.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, processing steps in communication control processing and processing of data transmission control in the present specification do not necessarily have to be executed chronologically along the order shown in the flowcharts. For example, the processing steps in the communication control processing and the processing of data transmission control may be executed in a different order from the order shown in the flowcharts or in parallel.

It is possible to create a computer program for causing hardware such as a CPU, ROM, and RAM built in a communication control apparatus (e.g. device included in the terminal apparatus or the control entity) to execute the same function as that of each configuration of the communication control apparatus. There may also be provided a storage medium having the computer program stored therein. There may also be provided an information processing device (e.g. processing circuit or chip) including a memory (e.g. ROM and RAM) having the computer program stored therein and one or more processors (e.g. CPU and DSP) capable of executing the computer program.

Note that the advantageous effects described herein are merely descriptive or illustrative, but not limitative. That is, the technology according to the present disclosure may attain another advantageous effect obvious to those skilled in the art from the present specification in combination with the advantageous effect discussed above or instead of the advantageous effects.

Additionally, the present technology may also be configured as below.

(1) A communication control apparatus including:
 an acquisition section configured to acquire first information related to communication quality of a wireless channel through which target data to be distributed to a terminal apparatus is transmitted to the terminal apparatus, and second information related to data among the target data, the data being accumulated in the terminal apparatus; and
 a control section configured to perform control over transmission of the target data to the terminal apparatus on the basis of the first information and the second information.

(2) The communication control apparatus according to (1),
 wherein the communication control apparatus is the terminal apparatus or a device included in the terminal apparatus.

(3) The communication control apparatus according to (2),
 wherein the control includes deciding to start or stop the transmission.

(4) The communication control apparatus according to (2),
 wherein the control includes setting a frequency of the transmission.

(5) The communication control apparatus according to (1) or (2),
 wherein the control includes deciding priority of the transmission through the wireless channel.

(6) The communication control apparatus according to (5),
 wherein the acquisition section acquires third information related to a request of a user of the terminal apparatus for the transmission, and wherein the control section decides the priority further on the basis of the third information.

(7) The communication control apparatus according to (5) or (6), wherein the priority is an indicator used for a node that performs control over transmission of data to an apparatus through the wireless channel to perform the control.

(8) The communication control apparatus according to any one of (1) to (7), wherein the first information includes communication quality information indicating the communication quality of the wireless channel.

(9) The communication control apparatus according to (8), wherein the communication quality information indicates at least one of a channel quality indicator of the wireless channel, reception strength or reception quality of a reference signal that is transmitted through the wireless channel, and a signal-to-interference-plus-noise ratio of the wireless channel.

(10) The communication control apparatus according to any one of (1) to (9), wherein the first information includes communication speed information indicating speed of the transmission of the target data to the terminal apparatus.

(11) The communication control apparatus according to any one of (1) to (10), wherein the first information further includes congestion information indicating a congestion level of the wireless channel.

(12) The communication control apparatus according to any one of (8) to (11), wherein the first information further includes communication system information related to a communication system responsible for the transmission through the wireless channel.

(13) The communication control apparatus according to (12), wherein the communication system information indicates at least one of a communication scheme to be adopted, a duplex scheme to be adopted, and bandwidth of a frequency band to be used or a number of frequency bands to be used.

(14) The communication control apparatus according to any one of (1) to (13), wherein the second information includes data amount information indicating an amount of the data among the target data, the data being accumulated in the terminal apparatus.

(15) The communication control apparatus according to any one of (1) to (14), wherein the second information includes time information indicating a time period necessary for the terminal apparatus to process the data accumulated in the terminal apparatus.

(16) The communication control apparatus according to any one of (1) to (15), wherein the data accumulated in the terminal apparatus is data among the target data, the data having been transmitted to the terminal apparatus, but not having been serially processed by the terminal apparatus.

(17) The communication control apparatus according to (16), wherein the communication control apparatus is the terminal apparatus or a device included in the terminal apparatus, and wherein the communication control apparatus further includes a management section configured to, when the data transmitted to the terminal apparatus among the target data is serially processed by the terminal apparatus, delete the data.

(18) The communication control apparatus according to (16) or (17), wherein the communication control apparatus is the terminal apparatus or a device included in the terminal apparatus, and wherein the communication control apparatus further includes a management section configured to calculate an amount of data among the target data, the data having been transmitted to the terminal apparatus, and having been serially processed by the terminal apparatus.

(19) A communication control method including:

acquiring first information related to communication quality of a wireless channel through which target data to be distributed to a terminal apparatus is transmitted to the terminal apparatus, and second information related to data among the target data, the data being accumulated in the terminal apparatus; and performing control, by a processor, over transmission of the target data to the terminal apparatus on the basis of the first information and the second information.

(20) A program for causing a computer to execute:

acquiring first information related to communication quality of a wireless channel through which target data to be distributed to a terminal apparatus is transmitted to the terminal apparatus, and second information related to data among the target data, the data being accumulated in the terminal apparatus; and performing control over transmission of the target data to the terminal apparatus on the basis of the first information and the second information.

What is claimed is:

1. A method, comprising:
controlling transmission of target data from a data distribution apparatus in a streaming manner through a wireless channel to a terminal apparatus; and
determining a priority of the transmission through the wireless channel from a base station to the terminal apparatus, wherein
the determination is based on information associated with accumulated data in the terminal apparatus,
the information associated with the accumulated data includes:
an amount of the accumulated data in the terminal apparatus, and
first time information that indicates a time period necessary for the terminal apparatus to process the accumulated data for playback of streaming data,
the priority includes a first priority and a second priority,
the transmission of the target data has the second priority, when the amount of the accumulated data in the terminal apparatus is smaller than a first threshold value or equal to the first threshold value,
the transmission of the target data has the first priority, when the amount of the accumulated data in the terminal apparatus is larger than the first threshold value,
the first threshold value is an amount of data received with the second priority during the time period,
the first priority is higher than the second priority,
the first priority increases network throughput, and
the accumulated data, among the target data, is transmitted through the wireless channel by the base station to the terminal apparatus.

2. The method according to claim 1, wherein
the information associated with the accumulated data further includes second time information that indicates a time period necessary for the terminal apparatus to process the accumulated data for reproduction of moving image data,
the time period to process the accumulated data for reproduction of the moving image data corresponds to one of a first time period or a second time period, and
the priority further includes a third priority greater than a fourth priority based on the first time period that is smaller than the second time period.

3. The method according to claim 2, wherein the time period to process the accumulated data for reproduction of the moving image data is associated with the amount of the accumulated data and at least one of a file format, a type of codec, or a resolution.

4. The method according to claim 1, further comprising determining the priority of the transmission through the wireless channel from the base station to the terminal apparatus, based on information associated with a communication quality of the wireless channel, and
the priority further includes a third priority greater than a fourth priority based on the communication quality that is greater than or equal to a second threshold value.

5. A control entity, comprising:
circuitry configured to:
control transmission of target data from a data distribution apparatus in a streaming manner through a wireless channel to a terminal apparatus; and
determine a priority of the transmission through the wireless channel from a base station to the terminal apparatus, wherein
the priority is determined based on information associated with accumulated data in the terminal apparatus,
the information associated with the accumulated data includes:
an amount of the accumulated data in the terminal apparatus, and
first time information that indicates a time period necessary for the terminal apparatus to process the accumulated data for playback of streaming data,
the priority includes a first priority and a second priority,
the transmission of the target data has the second priority, when the amount of the accumulated data in the terminal apparatus is smaller than a first threshold value or equal to the first threshold value,
the transmission of the target data has the first priority, when the amount of the accumulated data in the terminal apparatus is larger than the first threshold value,
wherein the first threshold value is an amount of data received with the second priority during the time period,
the first priority is higher than the second priority,
the first priority increases network throughput, and
the accumulated data, among the target data, is transmitted through the wireless channel by the base station to the terminal apparatus.

6. The control entity according to claim 5, wherein
the information associated with the accumulated data further includes second time information that indicates a time period necessary for the terminal apparatus to process the accumulated data for reproduction of moving image data,
the time period to process the accumulated data for reproduction of the moving image data corresponds to one of a first time period or a second time period, and
the priority further includes a third priority greater than a fourth priority based on the first time period that is smaller than the second time period.

7. The control entity according to claim 6, wherein the time period to process the accumulated data for reproduction of the moving image data is associated with the amount of the accumulated data and at least one of a file format, a type of codec, or a resolution.

8. The control entity according to claim 5, wherein
the circuitry is further configured to determine the priority of the transmission through the wireless channel from the base station to the terminal apparatus, based on information associated with a communication quality of the wireless channel, and
the priority further includes a third priority greater than a fourth priority based on the communication quality that is greater than or equal to a second threshold value.

9. The control entity according to claim 8, wherein
the information associated with the communication quality includes a congestion level of the wireless channel, and
the base station provides the control entity with congestion information.

10. The method according to claim 4, wherein
the communication quality of the wireless channel is identified by a Channel Quality Indicator (CQI), and
a higher CQI indicates at least one of a higher order modulation scheme or a larger number of bits to be transmitted per symbol.

11. The method according to claim 4, wherein
the information associated with the communication quality includes a congestion level of the wireless channel, and
the priority further includes the third priority greater than the fourth priority based on the congestion level that is lower than or equal to the second threshold value.

12. The method according to claim 4, wherein
the information associated with the communication quality includes a communication speed calculated as an amount of transmitted data per unit time,
the amount of transmitted data per unit time corresponds to the accumulated data in the terminal apparatus, and
the priority further includes the third priority greater than the fourth priority based on the communication speed that is greater than or equal to the second threshold value.

13. The method according to claim 1, further comprising:
determining suspension of the transmission through the wireless channel from the data distribution apparatus to the terminal apparatus, when the amount of the accumulated data is larger than or equal to a second threshold value; and
determining restart of the transmission through the wireless channel from the data distribution apparatus to the terminal apparatus, when the amount of the accumulated data is smaller than the first threshold value.

14. The control entity according to claim 8, wherein
the communication quality of the wireless channel is identified by a Channel Quality Indicator (CQI), and a higher CQI indicates at least one of a higher order modulation scheme or a larger number of bits to be transmitted per symbol.

15. The control entity according to claim 8, wherein
the information associated with the communication quality includes a communication speed calculated as an amount of transmitted data per unit time,
the amount of transmitted data per unit time corresponds to the accumulated data in the terminal apparatus, and
the priority further includes the third priority greater than the fourth priority based on the communication speed that is greater than or equal to the second threshold value.

16. The control entity according to claim 5, wherein the circuitry is further configured to:
determine suspension of the transmission through the wireless channel from the data distribution apparatus to the terminal apparatus, when the amount of the accumulated data that is larger than or equal to a second threshold value; and
determine restart of the transmission through the wireless channel from the data distribution apparatus to the terminal apparatus, when the amount of the accumulated data that is smaller than the first threshold value.

* * * * *